(12) United States Patent
Magrini et al.

(10) Patent No.: US 11,401,474 B2
(45) Date of Patent: Aug. 2, 2022

(54) SYSTEMS AND METHODS FOR PRODUCING FUEL INTERMEDIATES

(71) Applicant: Alliance for Sustainable Energy, LLC, Golden, CO (US)

(72) Inventors: Kimberly A. Magrini, Golden, CO (US); Yves Parent, Golden, CO (US); Mark William Jarvis, Denver, CO (US); Jessica L. Olstad-Thompson, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 16/869,101

(22) Filed: May 7, 2020

(65) Prior Publication Data
US 2020/0263098 A1 Aug. 20, 2020

Related U.S. Application Data

(63) Continuation-in-part of application No. 15/952,857, filed on Apr. 13, 2018, now abandoned.
(Continued)

(51) Int. Cl.
*C10G 51/02* (2006.01)
*C10G 1/02* (2006.01)
(Continued)

(52) U.S. Cl.
CPC ............ *C10G 51/026* (2013.01); *B01J 29/40* (2013.01); *C10G 1/02* (2013.01); *C10G 11/05* (2013.01);
(Continued)

(58) Field of Classification Search
CPC ......... B01J 29/084; B01J 29/40; C10G 11/08; C10G 11/18; C10G 1/02;
(Continued)

(56) References Cited

U.S. PATENT DOCUMENTS 8,277,643 B2 * 10/2012 Huber .................. C10G 1/08
44/605
8,829,258 B2 9/2014 Gong et al.
(Continued)

FOREIGN PATENT DOCUMENTS

WO 2012/062924 A1 5/2012

OTHER PUBLICATIONS

Agblevor et al., "Co-processing of Standard Gas Oil and Biocrude Oil to Hydrocarbon Fuels", Biomass and Bioenergy, 2012, vol. 45, pp. 130-137.
(Continued)

*Primary Examiner* — Latosha Hines
(74) *Attorney, Agent, or Firm* — Michael A. McIntyre

(57) ABSTRACT

The present disclosure relates to a method that includes pyrolyzing a biomass to produce a pyrolysis oil and upgrading the pyrolysis oil to yield a first upgraded pyrolysis oil, where the pyrolysis oil is in at least one of a liquid phase and/or a vapor phase, the pyrolyzing is performed in a pyrolysis reactor at a first temperature between 400° C. and 600° C., the biomass has a residence time of less than five seconds in the pyrolysis reactor, the upgrading is performed in a fluidized bed reactor, and the upgrading is catalyzed using a zeolite.

17 Claims, 33 Drawing Sheets

Related U.S. Application Data

(60) Provisional application No. 62/484,959, filed on Apr. 13, 2017.

(51) Int. Cl.
    *C10G 11/05* (2006.01)
    *C10G 11/18* (2006.01)
    *B01J 29/40* (2006.01)

(52) U.S. Cl.
    CPC ...... *C10G 11/18* (2013.01); *C10G 2300/1014* (2013.01); *C10G 2300/1074* (2013.01); *C10G 2300/4006* (2013.01); *C10G 2300/4081* (2013.01); *C10G 2300/70* (2013.01); *C10G 2400/30* (2013.01)

(58) Field of Classification Search
    CPC .... C10G 2300/1014; C10G 2300/1074; C10G 2300/4006; C10G 2300/4081; C10G 2300/70; C10G 2400/30; C10G 51/026
    See application file for complete search history.

(56) References Cited

U.S. PATENT DOCUMENTS

| | | | | |
|---|---|---|---|---|
| 9,512,495 | B2* | 12/2016 | Eyal | C11D 3/386 |
| 2008/0216391 | A1* | 9/2008 | Cortright | C10G 3/52 44/307 |
| 2013/0036660 | A1* | 2/2013 | Woods | C10L 1/08 585/24 |
| 2013/0212930 | A1* | 8/2013 | Naae | C10L 1/02 435/166 |
| 2014/0316176 | A1* | 10/2014 | Fjare | C10G 3/57 422/140 |
| 2015/0073181 | A1* | 3/2015 | Gorke | C10G 1/002 585/240 |
| 2017/0369787 | A1* | 12/2017 | Schaverien | C10G 9/32 |
| 2018/0298294 | A1 | 10/2018 | Magrini et al. | |

OTHER PUBLICATIONS

Al-Sabawi et al., "Fluid Catalytic Cracking of Biomass-Derived Oils and Their Blends with Petroleum Feedstocks: A Review", Energy Fuels, 2012, vol. 26, pp. 5355-5372.

Asadieraghi et al., "Heterogeneous Catalysts for Advanced Bio-fuel Production Through Catalytic Biomass Pyrolysis Vapor Upgrading: A Review", RSC Advances, 2015, vol. 5, pp. 22234-22255.

Diebold et al., "Biomass to Gasoline (BTG): Upgrading Pyrolysis Vapors to Aromatic Gasoline with Zeolite Catalysis at Atmospheric Pressure", American Chemical Society Division of Fuel Chemistry, Apr. 1987, vol. 32, No. 2, pp. 297-307.

Dutta et al., "Conceptual Process Design and Techno-Economic Assessment of Ex Situ Catalytic Fast Pyrolysis of Biomass: A Fixed Bed Reactor Implementation Scenario for Future Feasibility", Topics in Catalysis, 2016, vol. 59, No. 2, pp. 2-18.

Fogassy et al, "From Biomass to Bio-gasoline by FCC Co-processing: Effect of Feed Composition and Catalyst Structure on Product Quality", Energy & Environmental Science, 2011, vol. 4, pp. 5068-5076.

Fogassy et al, "Biomass Derived Feedstock Co-processing with Vacuum Gas Oil for Second-Generation Fuel Production in FCC Units", Applied Catalysis B: Environmental, 2010, vol. 96, pp. 476-485.

Gayubo et al., "Undesired Components in the Transformation of Biomass Pyrolysis Oil into Hydrocarbons on an HZSM-5 Zeolite Catalyst", Journal of Chemical Technology and Biotechnology, 2005, vol. 80, pp. 1244-1251.

Grams et al., "Influence of Ni Catalyst Support on the Product Distribution of Cellulose Fast Pyrolysis Vapors Upgrading", Journal of Analytical and Applied Pyrolysis, 2015, vol. 113, pp. 557-563.

Ibarra et al., "Synergy in the Cracking of a Blend of Bio-oil and Vacuum Gasoil Under Fluid Catalytic Cracking Conditions", Industrial & Engineering Chemistry Research, 2016, vol. 55, pp. 1872-1880.

Iliopoulou et al., "Pilot-scale Validation of Co-ZSM-5 Catalyst Performance in the Catalytic Upgrading of Biomass Pyrolysis Vapours", Green Chemistry, 2014, vol. 16, pp. 662-674.

Lappas et al., "Production of Biofuels via Co-processing in Conventional Refining Processes", Catalysis Today, 2009, vol. 145, pp. 55-62.

Mercader et al., "Production of Advanced Biofuels: Co-processing of Upgraded Pyrolysis Oil in Standard Refinery Units", Applied Catalysis B: Environmental, 2010, vol. 96, pp. 57-66.

Park et al., "Conversion of the Pyrolytic Vapor of Radiata Pine over Zeolites", Journal of Industrial and Engineering Chemistry, 2007, vol. 13, No. 2, pp. 182-189.

Pinho et al., "Co-processing Raw Bio-oil and Gasoil in an FCC Unit", Fuel Processing Technology, 2015, vol. 131, pp. 159-166.

Pinho et al., "Fast Pyrolysis Oil from Pinewood Chips Co-processing with Vacuum Gas Oil in an FCC Unit for Second Generation Fuel Production", Fuel, Jan. 2017, vol. 188, pp. 462-473.

Resasco et al., "Model Compound Studies Towards the Catalytic Upgrade of Bio-Oil in Vapor and Liquid Phases", (Preprint Paper) American Chemical Society Division of Fuel Chemistry, 2011, vol. 56, No. 1, pp. 22-23.

Schuurman et al., "Tomorrow's Biofuels: Hybrid Biogasoline by Co-processing in FCC Units", The Role of Catalysis for the Sustainable Production of Bio-fuels and Bio-chemicals, 2013, Chapter 10, pp. 321-349.

Thegarid et al., "Second-generation Biofuels by Co-processing Catalytic Pyrolysis Oil in FCC Units", Applied Catalysis B: Environmental, 2014, vol. 145, pp. 161-166.

Yung et al., "Multiscale Evaluation of Catalytic Upgrading of Biomass Pyrolysis Vapors on Ni- and Ga-Modified ZSM-5", Energy Fuels, 2016, vol. 30, pp. 9471-9479.

\* cited by examiner

SYSTEMS AND METHODS FOR PRODUCING FUEL INTERMEDIATES

CROSS-REFERENCE TO RELATED APPLICATIONS

This application claims the benefit of U.S. Non-provisional patent application Ser. No. 15/952,857 filed on Apr. 13, 2018, which claims the benefit of U.S. Provisional Patent Application No. 62/484,959 filed Apr. 13, 2017, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

The diminishing availability of high-quality crude oils, increasing worldwide energy demand, and associated environmental issues of fuel production and use make oils from nonfood, biomass-derived resources an attractive hydrocarbon fuel feedstock option. Biofuel production from processing pure biomass-derived (bioderived) materials and/or co-processing these materials with petroleum-derived feedstocks has the potential to significantly reduce greenhouse gas emissions (GHG) through the entire fuel production process chain. However, many technical difficulties still exist before biofuels can be technically and economically viable. Thus, there remains a need for improved technological solutions for producing fuels and fuel intermediates from biomass-derived materials.

SUMMARY

An aspect of the present disclosure is a method that includes pyrolyzing a biomass to produce a pyrolysis oil and upgrading the pyrolysis oil to yield a first upgraded pyrolysis oil, where the pyrolysis oil is in at least one of a liquid phase and/or a vapor phase, the pyrolyzing is performed in a pyrolysis reactor at a first temperature between 400° C. and 600° C., the biomass has a residence time of less than five seconds in the pyrolysis reactor, the upgrading is performed in a fluidized bed reactor, and the upgrading is catalyzed using a zeolite.

In some embodiments of the present disclosure, the upgrading may be performed at a second temperature between 450° C. and 600° C. In some embodiments of the present disclosure, the upgrading may be performed at a pressure between 1.0 atmosphere and 3.0 atmospheres. In some embodiments of the present disclosure, the zeolite may have an average bulk density between 0.80 g/cm3 and 1.00 g/cm3. In some embodiments of the present disclosure, the zeolite may include at least 50 wt % HZSM-5. In some embodiments of the present disclosure, the zeolite may have an average particle size between 60 μm to 100 μm. In some embodiments of the present disclosure, the biomass may include at least one of an agricultural waste, a forest waste, and/or a municipal waste. In some embodiments of the present disclosure, the biomass may include at least one of a hardwood, a softwood, and/or a grass.

In some embodiments of the present disclosure, the first upgraded pyrolysis oil may have a first composition that includes an aromatics concentration between about 45 wt % and about 57 wt %, where between about 27 wt % and about 31 wt % of the aromatics are 1-ring aromatics, and between about 61 wt % and about 65 wt % of the aromatics are 2-ring aromatics. In some embodiments of the present disclosure, the first composition may further include an oxygenates concentration between about 38 wt % and 48 wt %, where between about 26 wt % and about 31 wt % of the oxygenates are a phenolic, between about 41 wt % and about 44% of the phenolic is phenol, and between about 17 wt % and about 40 wt % of the phenolic is a methylphenol.

In some embodiments of the present disclosure, the method may further include recycling and feeding at least a portion of the first upgraded pyrolysis oil to the fluidized bed reactor to produce a second upgraded pyrolysis oil. In some embodiments of the present disclosure, the method may further include, prior to the feeding, mixing the portion with a petroleum-derived oil to form a mixture, and feeding the mixture to the fluidized bed reactor to yield a third upgraded pyrolysis oil. In some embodiments of the present disclosure, the mixing may be completed at a ratio of the portion to the petroleum-derived oil between 0:1 and 1000:1. In some embodiments of the present disclosure, the third upgraded pyrolysis oil may have a second composition that includes an aromatics concentration between about 45 wt % and about 52 wt %, where between about 60 wt % and about 63 wt % of the aromatics are 1-ring aromatics, and between about 34 wt % and about 37 wt % of the aromatics are 2-ring aromatics. In some embodiments of the present disclosure, the 1-ring aromatics of the second composition may include about 0 wt % benzene, between about 6 wt % and about 7 wt % toluene, and about 17 wt % xylene.

In some embodiments of the present disclosure, the method may further include, after the mixing and prior to the feeding, separating from the mixture a light phase from a heavy phase. In some embodiments of the present disclosure, the light phase may have a third composition that includes between about 52 wt % and about 57 wt % alkanes, between about 15 wt % and about 18 wt % alkenes, and between about 10 wt % and about 15 wt % aromatics. In some embodiments of the present disclosure, the third composition may further include between about 5 wt % and about 7 wt % oxygenates, where between about 38 wt % and about 57 wt % of the oxygenates are linear ketones, and between about 22 wt % and about 40 wt % of the oxygenates are 1-ring aldehydes.

In some embodiments of the present disclosure, the method may further include, after the separating, feeding, in place of the mixture, only the light phase to the fluidized bed reactor to yield a fourth upgraded pyrolysis oil. In some embodiments of the present disclosure, the method may further include, cofeeding, in place of the mixture, the light phase and the first upgraded pyrolysis oil to the fluidized bed reactor to yield a fifth upgraded pyrolysis oil.

An aspect of the present disclosure is a first composition that includes an aromatics concentration between about 45 wt % and about 57 wt %, where between about 27 wt % and about 31 wt % of the aromatics are 1-ring aromatics, between about 61 wt % and about 65 wt % are 2-ring aromatics, and the composition is produced by thermally upgrading at least one of a pyrolysis oil or a pyrolysis vapor.

An aspect of the present disclosure is a second composition that includes an aromatics concentration between about 45 wt % and about 52 wt %, where between about 60 wt % and about 63 wt % of the aromatics are 1-ring aromatics, between about 34 wt % and about 37 wt % of the aromatics are 2-ring aromatics, and the composition is produced by thermally upgrading a mixture comprising a bioderived portion and a petroleum-derived portion.

An aspect of the present disclosure is a third composition that includes between about 5 wt % and about 7 wt % oxygenates, where between about 38 wt % and about 57 wt % of the oxygenates are linear ketones, between about 22 wt % and about 40 wt % of the oxygenates are 1-ring aldehydes, and the composition is produced by contacting a bioderived oil with a petroleum-derived oil to form a mixture and separating the mixture into a light phase and a heavy phase, wherein the composition comprises the light phase.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 4A illustrates the 2D chromatogram for fast FP oils derived from the pyrolysis of pine, followed by vapor phase upgrading in the DCR using JM CP758 zeolite (i.e. CFP oils); FIG. 4B illustrates the 2D chromatogram for oils generated from upgrading VGO in the DCR using E-Cat; FIG. 4C illustrates the 2D chromatogram for FP oils derived from pyrolysis of pine, followed by vapor phase upgrading in the DCR using JM CP783 zeolite (i.e. CFP oils); and FIG. 4D illustrates the 2D chromatogram for CFP oils derived from pyrolysis of mixed hardwoods, followed by vapor phase upgrading in the DCR using JM CP758 zeolite.

FIG. 5A illustrates the distribution of compound classes (e.g. oxygenates, aromatics, etc.); FIG. 5B illustrates the distribution of aromatic compounds; FIG. 5C illustrates the distribution of oxygenates (e.g. ethers, acids, methoxies, etc.); FIG. 5D illustrates the distribution of 1-ring aromatic hydrocarbons; FIG. 5E illustrates the distribution of carbonyls; and FIG. 5F illustrates the distribution of phenols.

FIG. 11A represents CFP oil after mixing and phase separation (C of FIG. 10); FIG. 11B "enhanced" VGO containing CFP compounds (B of FIG. 10); and FIG. 11C "pure" VGO (A of FIG. 10), according to some embodiments of the present disclosure.

REFERENCE NUMBERS

Figure 1:
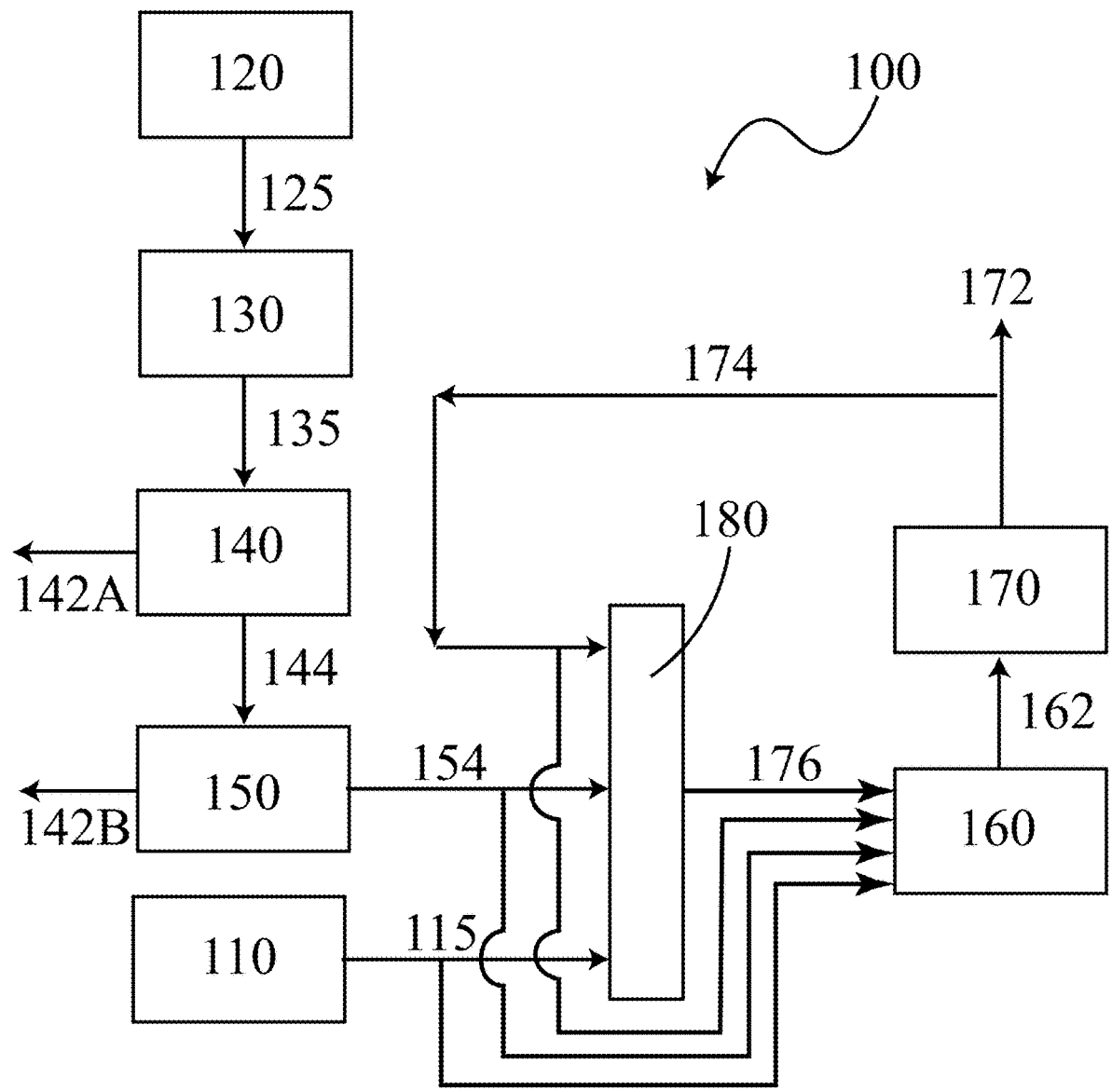
FIG. 1 illustrates a system for producing liquid products, according to some embodiments of the present disclosure.

| | |
|---|---|
| 100 | system |
| 110 | oil source |
| 115 | oil stream |
| 120 | biomass source |
| 125 | biomass |
| 130 | pyrolysis reactor |
| 135 | pyrolysis vapor |

| | |
|---|---|
| 140 | solids removal unit |
| 142 | impurity |
| 144 | intermediate pyrolysis vapor |
| 150 | filter |
| 154 | purified pyrolysis vapor |
| 160 | upgrading reactor |
| 162 | vapor product |
| 170 | condenser |
| 172 | liquid product stream |
| 174 | liquid recycle stream |
| 176 | mixture stream |
| 180 | mixing manifold |
| 200 | method |
| 210 | thermal degrading |
| 220 | separating |
| 240 | upgrading |
| 250 | condensing |
| 260 | recycling |
| 270 | combining |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to thermochemical biomass conversion with a focus on ex-situ upgrading of biomass pyrolysis vapors, also called vapor-phase upgrading (VPU), as an efficient and economical route to pyrolysis-based fuel precursors, fuels, and chemicals depending on catalyst choice, feedstock choice, and/or process conditions. In some embodiments of the present disclosure and as described herein, biomass vapors were generated via fast pyrolysis (FP) and destabilizing vapor components (e.g. char, inorganics, tar aerosols) were removed by hot gas filtration with the resultant conditioned vapors being more amenable to catalytic upgrading. A Davison Circulating Riser (DCR), a petroleum industry standard for fluid catalytic cracking (FCC) and catalyst evaluation, was coupled with a pyrolysis reactor system designed to produce consistent pyrolysis vapors as feed to the DCR. Baseline DCR tests with an equilibrium catalyst (E-Cat) and vacuum gas oil only (VGO—see Table 3 for a list of physical properties) showed that the system operated reproducibly to produce gasoline range hydrocarbons, as defined by distillation ranges. VGO is that portion of crude oil that has an initial boiling point of 340° C. or higher at atmospheric pressure and an average molecular weight ranging from about 200 g/mol to 600 g/mol or higher.

Pure hardwood or softwood pyrolysis vapors were upgraded in the DCR using a variety of catalysts that included zeolites and modified zeolites. Oils were condensed from the upgraded vapors and analyzed with $^{13}C$ nuclear magnetic resonance (NMR) spectroscopy, TGA based simulated distillation (SIM DIST) boiling point curve analysis, comprehensive two-dimensional gas chromatography coupled with time-of-flight mass spectrometry (GCxGC-TOFMS), total carbonyls by titration, and ultimate analysis (CHNO) to assess oil chemistry, process induced changes, and to identify the best conditions for producing fungible product liquids. Critical oil and/or liquid parameters evaluated include oxygenate content and composition, carbon content and composition, carbon conversion efficiency from biomass to products, and catalyst coking rates and are summarized in the tables and figures of this disclosure. In some embodiments of the present disclosure, zeolite catalysts produced upgraded pyrolysis oils and/or upgraded VGO with <12% oxygenate content. These upgrading results demonstrate the feasibility of producing refinery compatible hydrocarbon fuel intermediates entirely from biomass derived fast pyrolysis vapors and with or without cofeeding VGO using a DCR system and/or similar upgrading reactor (e.g. some other circulating fluid bed reactor).

Some of the embodiments described herein reduce process issues such as catalyst coking, pyrolysis oil age-induced chemical changes, and undesirable light gas production by co-feeding biomass pyrolysis liquids with VGO to produce fuels, by using modified FCC zeolite catalysts and a Davison Circulating Riser reactor. Additionally, in some embodiments of the present disclosure, a hot gas filter may be used to remove alkali and residual char particles from raw pyrolysis vapors to produce cleaner, stabilized feedstocks for subsequent catalytic upgrading. In some embodiments of the present disclosure, the resultant condensed liquid products (i.e. CFP oils) may be suitable as a fuel blend-stock material and/or as a liquid fuel and/or may be suitable for insertion into refining operations with oxygen contents of 10 wt % or less depending on the upgrading catalyst utilized in the upgrading reactor.

Referring to FIG. 1, as described herein, the materials resulting from the pyrolysis of biomass in a pyrolysis reactor 135 are referred to herein as FP vapor and/or oils and materials resulting from upgrading in an upgrading reactor 160 (e.g. DCR) are referred to as CFP vapor and/or oils. FIG. 1 illustrates a system 100 for producing a vapor product stream 162 (i.e. CFP vapor) and/or a liquid product stream 172 (i.e. CFP oil) based on the production of pyrolysis vapors derived from biomass 125, such that the pyrolysis vapors (i.e. FP vapor) may be fed to and reacted in an upgrading reactor 160 to produce the liquid product stream 172 (i.e. CFP vapor/oil). In some embodiments of the present disclosure, at least a portion of the liquid product stream 172 may be recycled back to the upgrading reactor 160, such that the liquid recycle stream 174 and the pyrolysis vapors react in the upgrading reactor 160 to form the liquid product stream 172. Thus, in some embodiments, a first liquid product may be produced, without the use of the liquid recycle stream 174, and a second liquid product may be produced (e.g. with different physical and/or performance properties than the first liquid product) by directing the liquid recycle stream 174 back to the upgrading reactor 160 for at least one additional pass through the upgrading reactor 160. In some embodiments of the present disclosure, the liquid recycle stream 174 may be combined with an oil stream 115 to form a mixture 176, which may then be fed with the pyrolysis vapors to the upgrading reactor 160, such that the pyrolysis vapors, the liquid recycle stream 174, and the oil stream 115 react in the upgrading reactor 160 to ultimately form the liquid product stream 172. Thus, a third liquid product may be produced by co-feeding a liquid recycle stream 174 and an oil stream 115, with the pyrolysis vapors, to the upgrading reactor, such that the third liquid product has different physical and/or performance properties than the first liquid product and/or the second liquid product. Thus, as described herein, the materials resulting from the pyrolysis of biomass in the pyrolysis reactor 135 are referred to herein as FP vapor and/or oils and materials resulting from upgrading in the upgrading reactor 160 (e.g. DCR), including the liquid recycle stream 174, are referred to as CFP vapor and/or oils.

In some embodiments of the present disclosure, an oil stream 115 may be co-fed with the pyrolysis vapors to the upgrading reactor 160, without the simultaneous use of a liquid recycle stream 174. Thus, a fourth liquid product may be produced by co-feeding an oil stream 115, with the pyrolysis vapors, to the upgrading reactor 160, such that the fourth liquid product has different physical and/or performance properties than the first liquid product, the second liquid product, and/or the third liquid product. Thus, in some embodiments of the present disclosure, the liquid recycle stream 174 from the upgrading reactor 160 may be combined with an oil stream 115 (e.g. VGO and/or some other liquid phase petroleum feedstock) and fed as a mixture 176 to the upgrading reactor 160. In some embodiments of the present disclosure, the liquid recycle stream 174 and an oil stream 115 may be fed as two distinct and separate feed streams to the upgrading reactor 160. In some embodiments of the present disclosure, the liquid recycle stream 174 and a gas phase stream (e.g. pyrolysis vapors, purified and/or otherwise) may be fed as two distinct and separate feed streams to the upgrading reactor 160. In some embodiments of the present disclosure, the liquid recycle stream 174 and a gas phase stream (e.g. pyrolysis vapors, purified and/or otherwise) may be mixed and fed as a mixture to the upgrading reactor 160. In some embodiments of the present disclosure, a pyrolysis vapor (e.g. 154), an oil stream 115, and the liquid recycle stream 174 may all be co-fed as three distinct streams to the upgrading reactor 160. In some embodiments of the present disclosure, one or more of the options described above may be performed using condensed pyrolysis vapors. Although VGO is one possible oil stream 115, other feasible oils that may be used according to some embodiments of the present disclosure include light cycle oil (LCO), and/or naphthenics. Sources 110 for such oil streams 115 may include petroleum-based sources and/or bioderived sources.

In summary, a process like system 100 illustrated in FIG. 1 can produce at least nine different classes of products by treating a combination of at least four different streams in an upgrading reactor 160 (e.g. a DCR). These are summarized in Table 1 below. As described above these nine product classes may be made by use of a mixing manifold 180. In summary, Products A, C, and E were tested and are described herein. Although a mixing manifold 180 is shown in FIG. 1, in some embodiments of the present disclosure, the various feed materials may be co-fed into an upgrading reactor 160 through different, dedicated entry points into the upgrading reactor 160, or a combination of mixing feedstocks in a manifold and feeding feedstocks using dedicated entry points. Product D and F in Table 1 refers to upgrading a liquid product resulting from contacting VGO with a pyrolysis oil, where the resultant "enhanced" VGO is subsequently upgraded in the upgrading reactor 160.

The method for making enhanced VGO is described in detail below and the resultant composition data are summarized in FIGS. 10-13 and 16A-16F.

TABLE 1

Upgraded Product Classes

| Final Product (172) | Purified Pyrolysis Vapor (154) | Liquid Recycle stream (174) | Oil stream (115) | Figure location |
|---|---|---|---|---|
| A | X | | | 5A-F, 6-9 |
| B | | X | | NA |
| C | | | X | 5A-F, 6-9, 14A-C, 15 |
| D | | | X* | NA |
| E | | X | X | 14A-C, 15 |
| F | | X | X* | NA |
| G | X | X | | NA |
| H | X | | X | NA |
| I | X | X | X | NA |

*enhanced VGO

Referring again to FIG. 1, a system 100 for producing a vapor product 162 and/or a liquid product stream 172 may include a biomass source 120 that produces a biomass 125 that is fed to a pyrolysis reactor 130 that produces pyrolysis vapor 135. Examples of biomass 125 that may be utilized in some embodiments of the present disclosure include agricultural waste, forest waste, and/or municipal waste with examples including bagasse, corn stover, wheat straw, hardwood and/or softwood and associated slash, demolition wood, and/or oriented strand board. Other examples of biomass 125 that may be utilized include hardwoods (e.g. oak), softwoods (e.g. pine), and/or various grasses (e.g. switchgrass, bamboo, elephant grass, miscanthus, etc.) Biomass 125 may be directed to the pyrolysis reactor 130 such that the biomass 125 is heated, in the absence of oxygen ($O_2$), to the point that the biomass 125 thermally degrades to produce pyrolysis vapor 135. The resultant pyrolysis vapor 135 may include a large number of components in the vapor phase as well as solid materials and/or other product species (e.g. char, alkali species, and aerosols). Additionally, biomass derived syngas (CO, $CO_2$, $H_2$2) from gasification may be used to enrich pyrolysis vapors with carbon species and hydrogen for upgrading, as can recycling upgraded product vapors consisting of light hydrocarbon species to $C_{3+}$ and $CO_2$, CO and $H_2$.

The vapor phase components of the pyrolysis vapor 135 may include various cellulose degradation products, hemicellulose degradation products, and/or lignin degradation products with examples including acids, alcohols, carbonyls, aldehydes, alkenes ($C_3$-$C_{10+}$), alkanes, aromatics (1-3 ring), esters, furans, ketones, methoxies, phenols, anhydrosugars, and nitrogen containing compounds. Specific examples of organic pyrolysis vapor compounds include acetic acid, propionic acid, ethylene glycol, hydroquinone, catechol, glyoxal, benzene, toluene, styrene, indene, methylindene, naphthalene, methylnaphthalene, butyrolactone, furfural, furfuryl alcohol, 1-(2-furanyl)ethanone, 4-methyl-3-penten-2-one, 2-cyclopenten-1-one, 2-methyl-2-cyclopenten-1-one, 2,3-dimethyl-2-cyclopenten-1-one, 3-methyl-2-cyclopenten-1-one, 3,4-dimethyl-2-cyclopenten-1-one, 2-hydroxy-3-methyl-2-cyclopenten-1-one, 3-ethyl-2-cyclopenten-1-one, 3-ethyl-2-hydroxy-2-cyclopentene-1-one, 2,3-dihydroxy-1H-inden-1-one, benzylnitrile, pyridinol, indole, methylindole, hydroxyacetaldehyde, acetol, 1-hydroxy-2-butanone, 4-hydroxy-4-methyl-2-pentanone, 2,3-dihydrobenzofuran, guaiacol, 2-methoxy-4-methylphenol, 4-ethyl-2-methoxyphenol, 2-methoxy-4-vinylphenol, 2-methoxy-4-vinylphenol, eugenol, isoeugenol, 2,6-dimethoxyphenol, phenol, o-cresol, 2,5-dimethylphenol, p-cresol, m-cresol, 2,4-dimetylphenol, 3,5-dimethylphenol, 4-ethylphenol, 3-ethylphenol, 2-ethylphenol, 4-ethyl-3-methyl phenol, 4-(1-methylethyl)phenol, 2-me-1,4-benzenediol, 2,3-anhydro-D-mannosan, 1,4:3,6-dianhydro-α-D-glucopyranose, and/or levoglucosan.

In addition, lower molecular weight pyrolysis compounds may react with each other to produce higher molecular weight compounds, e.g. tars, multi-ring compounds like naphthalenes, and/or char. Char is a condensed carbon solid material obtained from the thennochemical conversion of biomass in an oxygen-limited environment. Biochar can be used for a range of applications as an agent for soil improvement, improved resource use efficiency, remediation and/or protection against particular environmental pollution and as an avenue for greenhouse gas (GHG) mitigation. In addition, to be recognized as biochar, the material has to pass a number of material property definitions that relate both to its value (e.g., H/Corg ratios relate to the degree of charring and therefore mineralization in soil) and its safety (e.g., heavy metal content). In addition, the pyrolysis vapor 135 may include alkali and/or alkaline earth elements including K, Na, Mg, and Ca. Alkali and alkaline earth materials play essential roles in plant metabolism and occur in organic structures or very mobile, inorganic forms. Potassium and calcium are the most common examples. These species can vaporize during pyrolysis and deposit on cooler surfaces including reactor walls and catalyst surfaces. They can also induce gas phase polymerization reactions among reactive biomass pyrolysis species. Thus, in some embodiments of the present disclosure, alkali and/or alkaline earth elements may be removed from pyrolysis vapors via hot gas filtration to provide a cleaner, stabilized vapor for catalytic upgrading.

The components/compounds making up pyrolysis vapor 135 (i.e. FP vapor/oil) made in a pyrolysis reactor 130 may depend significantly on the type of biomass 125 used (e.g. switchgrass versus hardwood) and on the type of pyrolysis reactor 130 used. Fast pyrolysis reactors within the scope of the present disclosure include vertical and/or horizontal fluidized-bed pyrolysis reactors, where the reactors may or may not use a solid catalyst such as olivine. A biomass pyrolysis reactor system may include at least one of a feed hopper, a lock hopper, a dosing screw/hopper, and/or a fast feed screw that introduces biomass (1-2 mm particle size, 0.5-1.5 kg dose up to 5 kg/hr) into the pyrolysis reactor. The pyrolysis reactor 130 used for the work described herein included a 2 inch inside diameter by 40 inch long stainless-steel pipe located between the biomass inlet and the reactor outlet. In some embodiments of the present disclosure, operating conditions were as follows: nitrogen fluidization to achieve about a two second biomass residence time in the pyrolysis reactor, a pyrolysis reactor temperature of about 500° C., a pyrolysis reactor pressure of 35 psig, and a biomass to nitrogen feed ratio to the pyrolysis reactor of about 0.5. A ceramic hot gas filter removed alkali and residual char particles from the produced pyrolysis vapor of which a portion (at 400° C.) was sent to the DCR. The primary flow of pyrolysis vapors was condensed in a spray tower with dodecane at about 25° C. and separated from the resultant liquid mixture in a horizontal phase separator. In some embodiments of the present disclosure, water and/or steam was provided to the pyrolysis reactor 130 such that the water and/or steam reacted with the biomass 125 to form the pyrolysis vapor 135.

Thus, in some embodiments of the present disclosure, pyrolysis vapor 135 produced in a pyrolysis reactor 130 may be purified to include substantially only organic vapor-phase components by passing the pyrolysis vapor 135 through one or more separation units. For example, referring again to FIG. 1, the pyrolysis vapor 135 may be passed through a solids removal unit 140 to form an intermediate pyrolysis vapor 144 by removing a first impurity 142A from the pyrolysis vapor 135. In some embodiments of the present disclosure, the solids removal unit 140 may include at least one of a cyclone, a mechanical filter, and/or an electrostatic filter that removes material in the solid phase (e.g. char and/or unreacted biomass) from the pyrolysis vapor 135. The intermediate pyrolysis vapor 144 may be subsequently directed to a filter 150 such that a second impurity 142B is removed (e.g. alkali, residual char particles<10 microns (cyclones do not efficiently capture these size particles) and aerosols) to form a purified pyrolysis vapor 154, which as described herein, may be directed to an upgrading reactor 160 with or without additional feed streams to produce valuable fuels and chemicals.

In some embodiments of the present disclosure, a filter 150 constructed of 10 to 20 filtration grade (0.3 μm) Pall Schumalith and/or Dia-Schumalith elements was used. Such a filter 150 was typically operated at a system pressure between 20 psia and 50 psia, at a minimum gas temperature of 410° C., at a maximum differential pressure between 20 inches of $H_2O$ and 60 inches of $H_2O$, a typical differential pressure of >27 inches of $H_2O$, and a maximum face velocity between 10 m/h and 400 m/h. Operating the filter 150 in this fashion resulted in solids collecting in a cake on the outside of the filter element. At the end of a run, or when the filter vessel was taken off-line (e.g. when pyrolysis vapors were not being directed to the filter) the element was blown back with high pressure nitrogen (200 pig) and the solids were collected at the bottom of the filter vessel. The bottom of the filter vessel was then cooled down and the bottom flange was removed to remove the solids from the system. The filter elements were able to sustain 750° C. in an oxidizing atmosphere for burning off the char. The biomass ash was left behind and removed through an appropriate vent when the filter vessel was taken off-line.

Referring again to FIG. 1, the resultant purified pyrolysis vapor 154 (i.e. FP vapor/oil) may then be directed to the upgrading reactor 160 such that the purified pyrolysis vapor 154 reacts in the upgrading reactor 160 to form a vapor product stream 162 and/or liquid product stream 172 (i.e. CFP vapor/oil). Note that the liquid product stream 172 may be obtained by condensing the vapor product stream 162 exiting the upgrading reactor 160 in any suitable condenser. In some embodiments of the present disclosure, an upgrading reactor 160 may be a batch reactor, a continuous reactor, and/or a semi-continuous reactor. Further, the upgrading reactor 160 may include at least one of a packed-bed reactor and/or a fluidized-bed reactor. In some embodiments of the present disclosure, the upgrading reactor 160 may include a Davison Circulating Riser (DCR). Thus, an upgrading reactor 160 may contain a solid catalyst (not shown) that promotes the reaction of the feed materials (e.g. at least one of the purified pyrolysis vapor 154, the oil stream 115, and/or the liquid recycle stream 174) to produce the final liquid product stream 172.

Examples of suitable solid catalysts for use in the upgrading reactor 160 include aluminosilicates. As used herein, "aluminosilicate" refers to materials containing aluminum, silicon, and oxygen. Examples of aluminosilicates include day minerals and zeolites. Examples of clay minerals include kaolin, smectite, illite, chlorite, sepiolite, and attapulgite. A zeolite is a macroporous crystalline aluminosilicate, composed of $TO_4$ tetrahedra, wherein T is a silicon or aluminum atom, with oxygen atoms connecting neighboring tetrahedral. The extra-framework cations in zeolites and molecular sieves are ion exchangeable. The amount of aluminum within the framework can vary over a wide range, with silicon to aluminum ratios varying from 1 to 1 to infinity to 1 for the case where the zeolite contains no aluminum, the completely siliceous form of $SiO_2$. As the amount of trivalent aluminum is increased in a zeolite's framework, the zeolite's physical properties may change. Cations may be placed (or deposited) onto the surfaces and/or within the pores of a zeolite and/or a molecular sieve. Examples of such ion-exchangeable cations that may be deposited onto a zeolite crystalline surface include monovalent cations such as $F^{30}$, $Li^+$, $K^+$, $Rb^+$, $Cs^+$, $Ag^+$, and $Tl^+$, divalent cations such as $Cd^{2+}$, $Ca^{2+}$, $Sr^{2+}$, $Cu^{2+}$, $Pt^{2+}$, and $Ba^{2+}$, rare earth ions such as $La^+$, transition metal ions such as Cr, Mo, W, Mn, Fe, Ni, Cu, Zn, Ag, Al, and Ga, having a variety of valence charges, noble metals such as Pt and Pd in the form of $Pt(NH_3)_4^{2+}$ and $Pd(NH_3)_4^{2+}$ respectively, inorganic ions such as ammonium ($NH_4^+$), tetramethylammoniuim ion (TMA), tetraethylammonium ion (TEA), tetrapropylammonium (TPA), benzyltrimethylammonium (BTMA), and $C_1$-$C_4$ mono-n-alkyl ammonium, and/or di-n-alkylammonium (MA, EA, PA, BA, M2A, E2A, P2A, B2A) ions.

In some embodiments of the present disclosure, the solid catalyst used in the upgrading reactor 160 may include a molecular sieve, where the term "molecular sieve" refers to crystalline aluminosilicate materials (e.g. zeolites) that incorporate other elements instead of or in addition to silicon and aluminum. For example, aluminophosphates (AlPOs) have strictly alternating $AlO_2^-$ and $PO_2^+$ units, and the framework is neutral, organophilic, and nonacidic. The alternation of aluminum or phosphorus leads to structures lacking in odd-numbered rings. Substitution of phosphorus by silicon leads to silicoaluminophosphates (SAPOs), with cation-exchange abilities. Some molecular sieves may also include one or more elements and/or compounds as catalytic active sites, as described above for zeolites.

Zeolites and molecular sieves may be characterized as small, medium, or large pore types. Non-limiting examples of these zeolites/molecular sieves include the small pore zeolites/molecular sieves, AEI, AFT, APC, ATN, ATT, ATV, AWW, BIK, CAS, CHA, CHI, DAC, DDR, ED1, ER1, GOO, KFI, LEV, LOV, LTA, MON, PAU, PHI, RHO, ROG, THO, and substituted forms thereof; the medium pore zeolites/molecular sieves, AFO, AEL, EUO, HEU, FER, MEL, MFI, MTW, MTT, TON, and substituted forms thereof; and the large pore zeolites/molecular sieves, including BEA, EMT, FAU, and substituted forms thereof. Other zeolites/molecular sieves include ANA, CFI, CLO, DON, GIS, LTL, MER, MOR, MWW, SOD, faujasites, pentasils, mordenite, beta, VPI, MCM, SAPO, MeAPO, ELAPO, and ELAPSO, zeolite X, zeolite Y, VPI-5, MCM-41, ZSM-5, ZSM-11, ZSM-14, ZSM-17, ZSM-18, ZSM-20, ZSM-31, ZSM-34, ZSM-41 and ZSM-46.

A zeolite may contain pores formed from 6-membered ring, 8-membered ring, 10-membered ring, 12-membered ring, 18-membered ring, and/or a larger membered ring of silicon (or aluminum) and oxygen pairs. For example, the term "8-membered ring" refers to a closed loop that is built from eight tetrahedrally coordinated silicon (or aluminum) atoms and eight oxygen atoms. These rings form pores with characteristic diameters. By way of example 8-membered ring ZK-5 (KFI) has a characteristic pore size of about 4 Å, 10-membered ring ZSM-5 has a characteristic pore size of about 5.5 Å, and 12-membered ring beta (BEA) zeolite has a characteristic pore size of about 7.5 Å.

Solid catalysts, including zeolites and molecular sieves, may be incorporated in another material referred to herein as a "matrix" or "binder". Such matrix materials may include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with zeolite and/or molecular sieves include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In some cases, a matrix or binder may also act as a catalyst. Equilibrium catalyst (E-Cat) is a mixture of FCC catalyst material of various age and level of activity which as whole best represents the level of activity of the average catalyst mass in the reactor. Typical FCC catalyst is composed mostly of Y zeolite with or without cation exchange bound in a matrix of clay and/or metal oxides. Other FCC catalyst components, additives or promoters may be found in the E-Cat solid mixture. These additives may include ZSM-5 zeolite containing particles that contribute to the overall catalytic activity.

Table 2 below summarizes catalysts used in the upgrading reactor, according to some embodiments of the present disclosure. Other suitable examples include P-doped HZSM-5 zeolites, and/or metal modified zeolites (for example at least one of Ni, Ga, Cu, Pt, and/or Ru).

TABLE 2

Upgrading Reactor Catalyst Properties

| Property | E-Cat | CP758 | CP783 |
|---|---|---|---|
| SAR (Si:Al molar ratio) | | 30 | 30 |
| Na (wt %) | 0.2 | 0.1 | NA |
| 0-20 μm (%) | 0.0 | 2.0 | 1 |
| 0-40 μm (%) | 5.0 | 10 | 10 |
| Average Bulk Density (g/cc) | 0.87 | 0.72 | 0.74 |
| Average Particle Size (μm) | | 90 | 109 |
| Surface Area (m²/g) | 174 | 130 | 90 |

Referring again to FIG. 1, in some embodiments of the present disclosure purified pyrolysis vapor 154 may be fed to an upgrading reactor 160, either directly, or as shown in FIG. 1, after passing through a mixing manifold 180. In some embodiments of the present disclosure, at least a portion of the pyrolysis vapor 135 (e.g. unpurified) may be fed directly to the upgrading reactor 160 and/or at least a portion of the intermediate pyrolysis vapor 144 may be fed directly to the upgrading reactor 160 (neither of these direct routes to the upgrading reactor 160 are shown in FIG. 1). Thus, a pyrolysis vapor including at least one of the purified pyrolysis vapor 154, the intermediate pyrolysis vapor 144, and/or the pyrolysis vapor 135 (e.g. unpurified) may be directed to the upgrading reactor 160 for the production of a vapor product stream 162 and/or liquid product stream 172. As described above, a pyrolysis vapor (135, 144, and/or 154) may be combined with at least one of an oil stream 115 and/or a liquid recycle stream 174 derived from at least a portion of the liquid product stream 172. As shown in FIG. 1, in some embodiments of the present disclosure, the combining of these feed streams may be achieved in a mixing manifold 180. In some embodiments of the present disclosure, the purified pyrolysis vapor 154 directed to the upgrading reactor 160 may be co-fed with an oil stream 115 by combing these two stream in a mixing manifold 180, at a pyrolysis vapor to oil mass ratio of between 5:95 and 25:75, or between 10:90 and 15:85, resulting in Product H in Table 1. In some embodiments of the present disclosure, the purified pyrolysis vapor 154 directed to the upgrading reactor 160 may be co-fed with the liquid recycle stream 174 at a pyrolysis vapor to liquid recycle mass ratio between 1:1 and 20:1, resulting in Product G in Table 1. In some embodiments of the present disclosure, the purified pyrolysis vapor 154, the liquid recycle stream 174 and the oil stream 115 may be combined in a mixing manifold 180 to produce a mixture 176 having a liquid recycle to oil mass ratio between 0:1 and 1000:1, and directed to the upgrading reactor 160, resulting in Product I of Table 1. Product A may be produced by feeding only purified pyrolysis vapor 154 to the upgrading reactor 160, Product C and D may be produced by feeding only an oil stream 115 to the upgrading reactor 160, and Products E and F may be produced by cofeeding a liquid recycle stream 174 (i.e. CFP oil and/or vapor) with an oil stream 115.

Table 3 provides a summary of typical VGO physical properties, an exemplary oil stream 115, according to some embodiments of the present disclosure. Other petroleum-derived oils may also be used in some embodiments of the present disclosure, as well as other petroleum fractions include light cycle oil (LCO) and/or kerosene.

TABLE 3

| VGO Properties | |
|---|---|
| API (° API) | 24.7 |
| Specific Gravity | 0.9059 |
| K Factor | 12.01 |
| Refractive Index | 1.5037 |
| Average Molecular Weight (g/mol) | 430 |
| Arom Ring Carbons Ca (wt %) | 17.6 |
| Naphthenic Ring C Cn (wt %) | 20.3 |
| Paraffinic Carbons Cp (wt %) | 62.1 |
| Sulfur (wt %) | 0.35 |
| Basic Nitrogen (wt %) | 0.046 |
| Total Nitrogen (wt %) | 0.14 |
| Conradson Carbon (wt %) | 0.32 |
| Zn (ppm) | 0.1 |

In some embodiments of the present disclosure, the final vapor product stream 162 and/or liquid product stream 172 produced in an upgrading reactor 160 may have at least reduced carbonyl and/or phenol contents, compared to the feed streams, with an aggregate weight percent of oxygenates of less than 10 wt %. The liquid product stream 172 produced in the upgrading reactor 160 may initially exit the upgrading reactor 160 as a vapor product stream 162, which may be subsequently condensed in a condenser 170 to produce the liquid product. In some embodiments of the present disclosure, up to 100% of the vapor product stream 162 may be condensed, with non-condensables venting (not shown) from the condenser.

Figure 2:
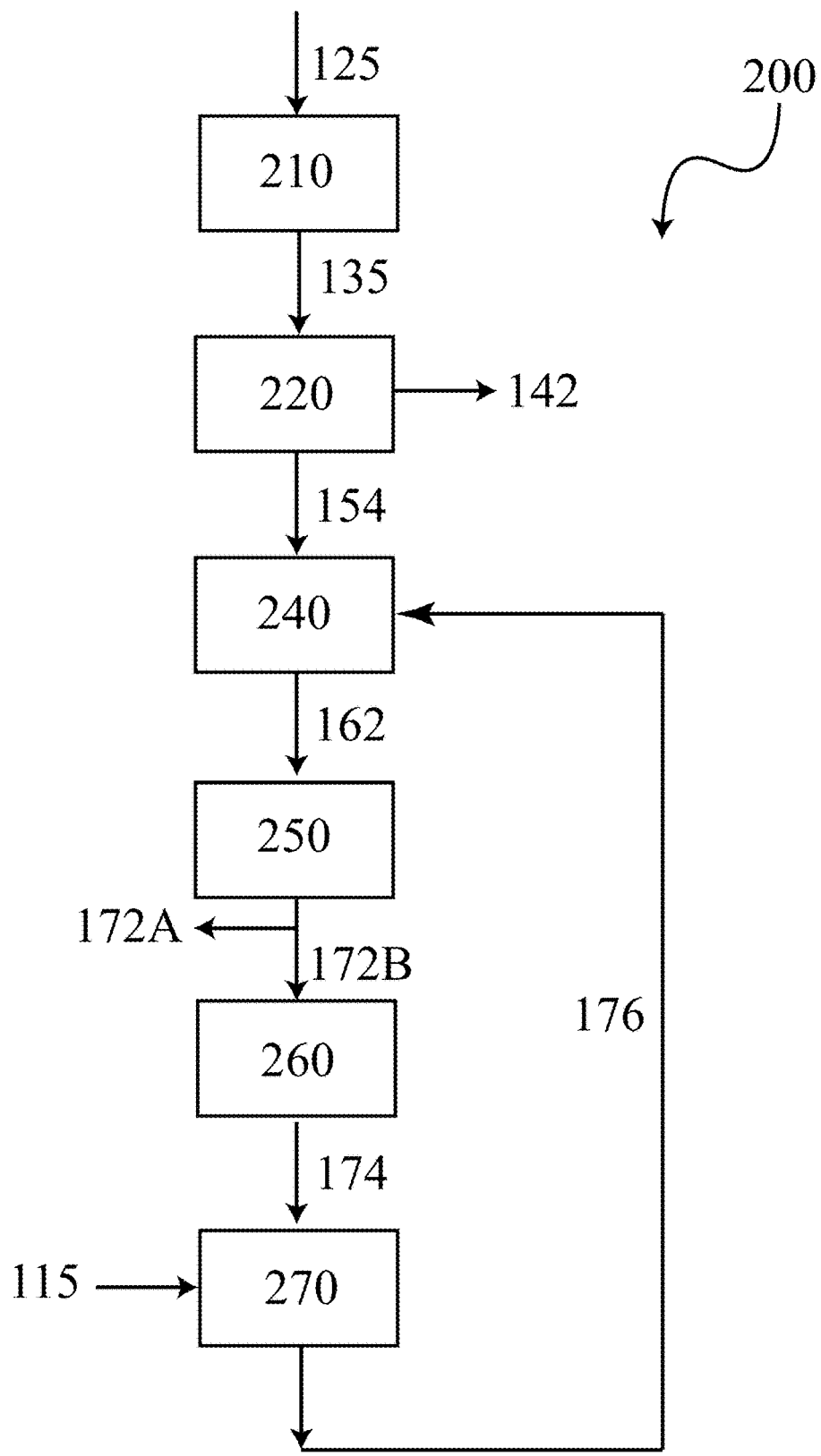
FIG. 2 illustrates a method for producing liquid products, according to some embodiments of the present disclosure.

FIG. 2. illustrates a method 200 for producing a liquid product stream 172 by upgrading 240 a pyrolysis vapor in an upgrading reactor as described above. As shown in FIG. 2, the method 200 may begin with a thermal degrading 210 of a biomass 125 to produce a pyrolysis vapor 135. The method 200 may then proceed with the separating 220 of impurities 142 (e.g. solids) contained in the pyrolysis vapor 135 to produce a purified pyrolysis vapor 154. The separating 220 may be achieved in one or more unit operations as previously described. The method 200 may then continue with the upgrading 240 of the purified pyrolysis vapors 154 (or as described above, intermediate pyrolysis vapors and/or the pyrolysis reactor pyrolysis vapor products) to produce a vapor product stream 162. As previously described, the upgrading 240 may include co-feeding at least one of an oil stream 115 and/or a liquid recycle stream 174 with a pyrolysis vapor stream. Referring again to FIG. 2, for example, the vapor product stream 162 may result in a liquid product stream 172 by condensing 250 the vapor product stream 162. A first portion of the liquid product stream 172A may be diverted as a final product and a second portion of the liquid product stream 172B may remain in the system by recycling 260 the second portion of the liquid product stream 172B to the upgrading reactor. In some embodiments of the present disclosure, the liquid product stream 172B may be used to form a mixture 176 by combining 270 an oil stream 115 with the liquid recycle stream 174, with the mixture 176 subsequently directed to the upgrading 240 (e.g. to the upgrading reactor).

EXAMPLES

Catalysts and feedstocks: Baseline DCR operations to produce gasoline were periodically verified with standard vacuum gas oil fed to the DCR by itself and an equilibrium catalyst (Y-type zeolite) with 2D GC TOFMS analysis of liquid product used to measure system reproducibility. Oak-derived fast pyrolysis vapors were co-fed with the same VGO as above (added oak fast pyrolysis vapor in a separate feed line to the DCR so that both feeds were in the mixing chamber together) to assess the impact of pyrolysis vapor on catalyst performance including coking and subsequent gasoline product composition, during DCR upgrading to a gasoline liquid product. These results were used to determine catalyst circulation rates for pure fast pyrolysis vapor feeding (e.g. without any VGO or recycle) to the DCR. Several catalysts comprising E-Cat, ZSM-5, and a phosphorous stabilized ZSM-5, CP758 zeolite, and CP783 were evaluated for pure pyrolysis vapor upgrading performance. Condensed liquid products were characterized for composition to understand catalyst induced changes. Some of the zeolite catalysts used in this study minimized oxygenated products to 12 wt % or less. Table 2 above lists typical catalyst properties.

In general, the FCC catalysts are fine, spray-dried powders having a bulk density of 0.80 to 0.96 g/cm$^3$ and an average particle size of 60 to 100 μm. Current FCC catalysts consist of three major components: crystalline zeolite, binder, and/or filler. Crystalline zeolite is the primary active component and can range from about 15 to 50 weight percent of the total catalyst (all three major components). Feedstocks used in this work were oak as a representative hardwood and pine as representative softwood. Their properties are shown in Table 4.

TABLE 4

Composition of woody biomass for pyrolysis experiments

| Compound | Mixed Hardwoods | Loblolly Pine |
|---|---|---|
| | Wt % | |
| Total Sugars | 64.59 | 64.17 |
| Glucan | 41.82 | 39.27 |
| Xylan | 14.91 | 7.36 |
| Galactan | 1.20 | 2.89 |
| Arabinan | 0.00 | 2.76 |
| Mannan | 6.67 | 11.90 |
| Lignin | 29.03 | 34.28 |
| Ash | 0.43 | 0.79 |
| Extractives | 6.52 | 4.40 |
| Total | 100.58 | 103.64 |

Figure 3:
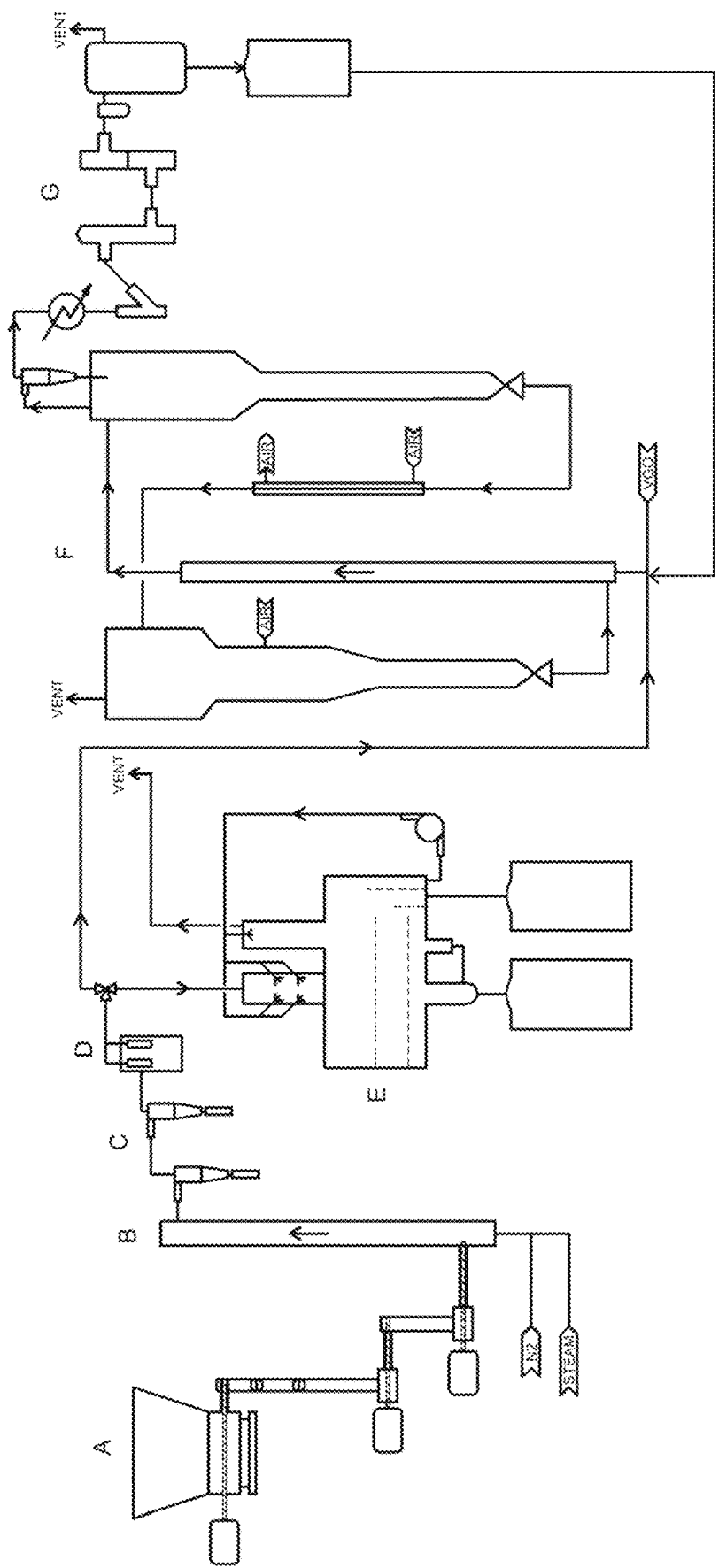
FIG. 3 illustrates a schematic of a system that includes a Davison Circulating Riser (DCR) reactor and a pyrolysis reactor for producing liquid products, according to some embodiments of the present disclosure.
Figure 4A:
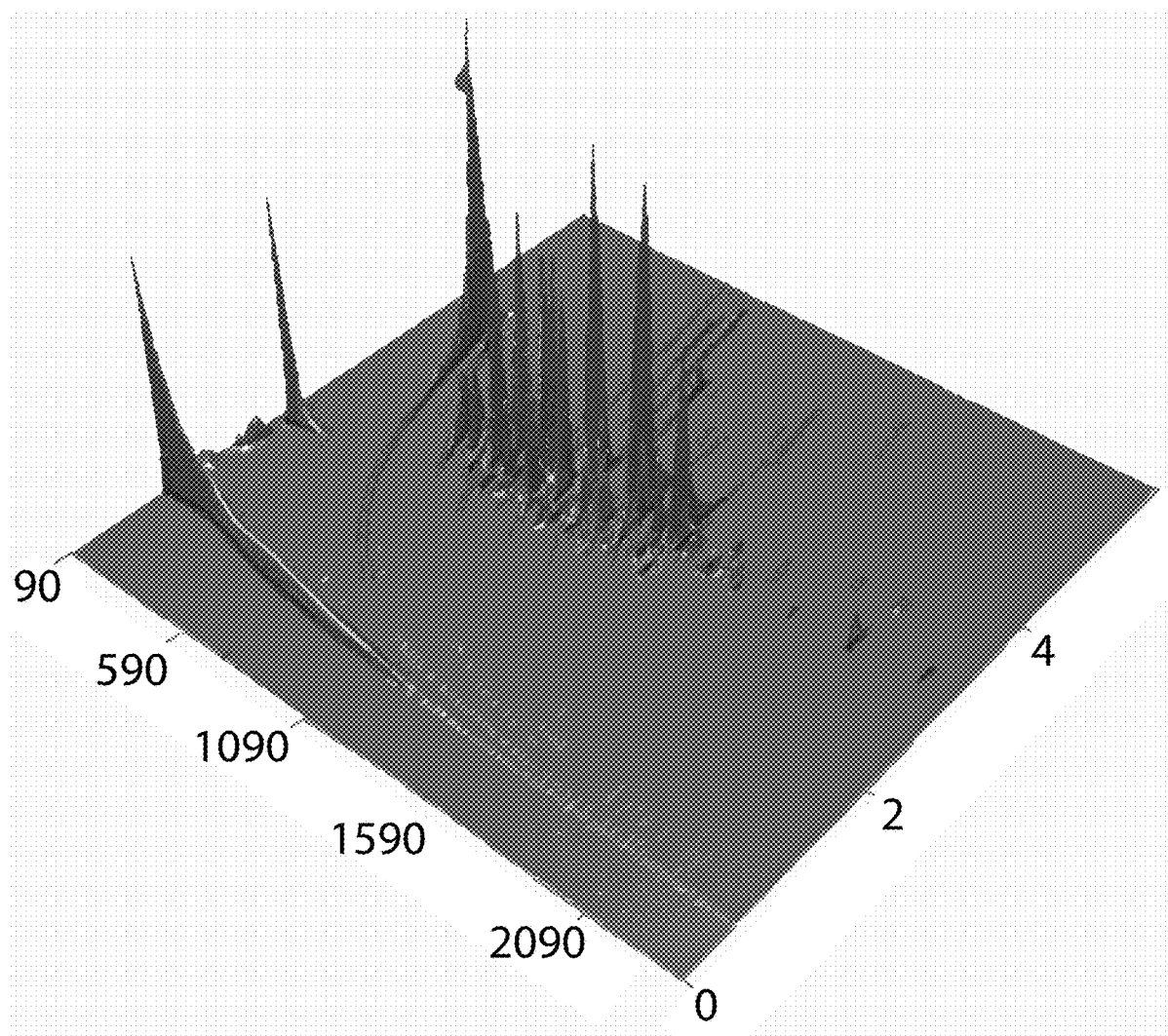
FIGS. 4A-4D illustrate 2D chromatograms generated by GCxGC-TOFMS of fast pyrolysis (FP), catalytic fast pyrolysis (CFP) oils, and vacuum gas oil (VGO) produced gasoline range distillate, according to some embodiments of the present disclosure.
Figure 4B:
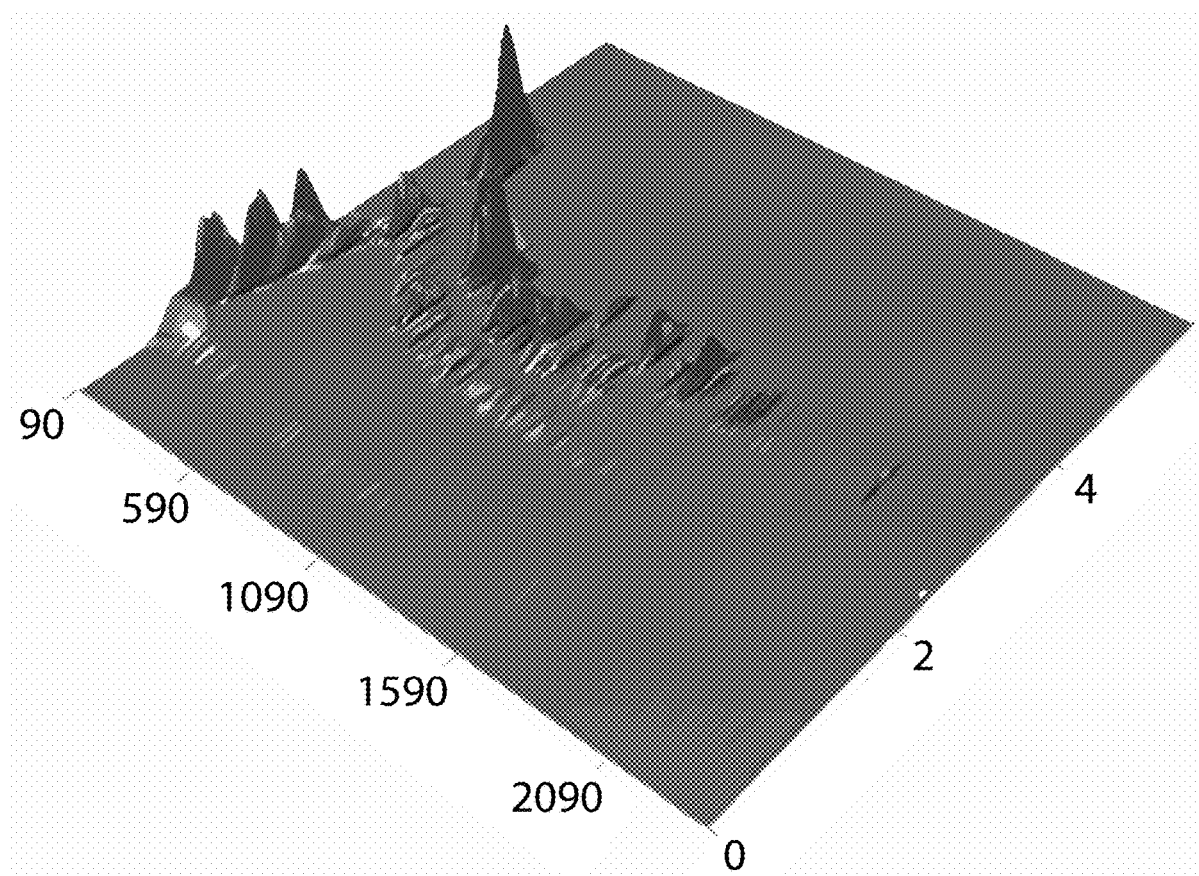
Figure 4C:
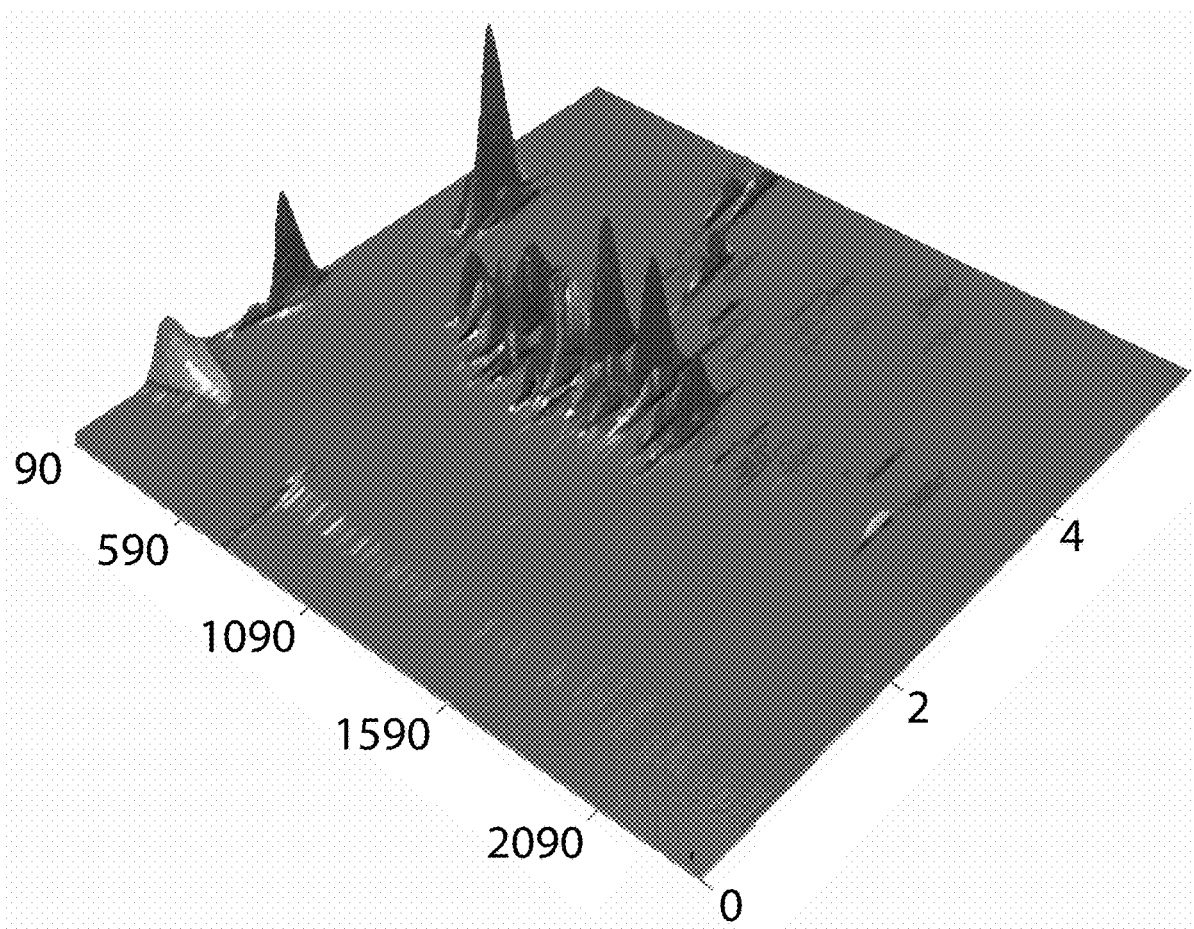
Figure 4D:
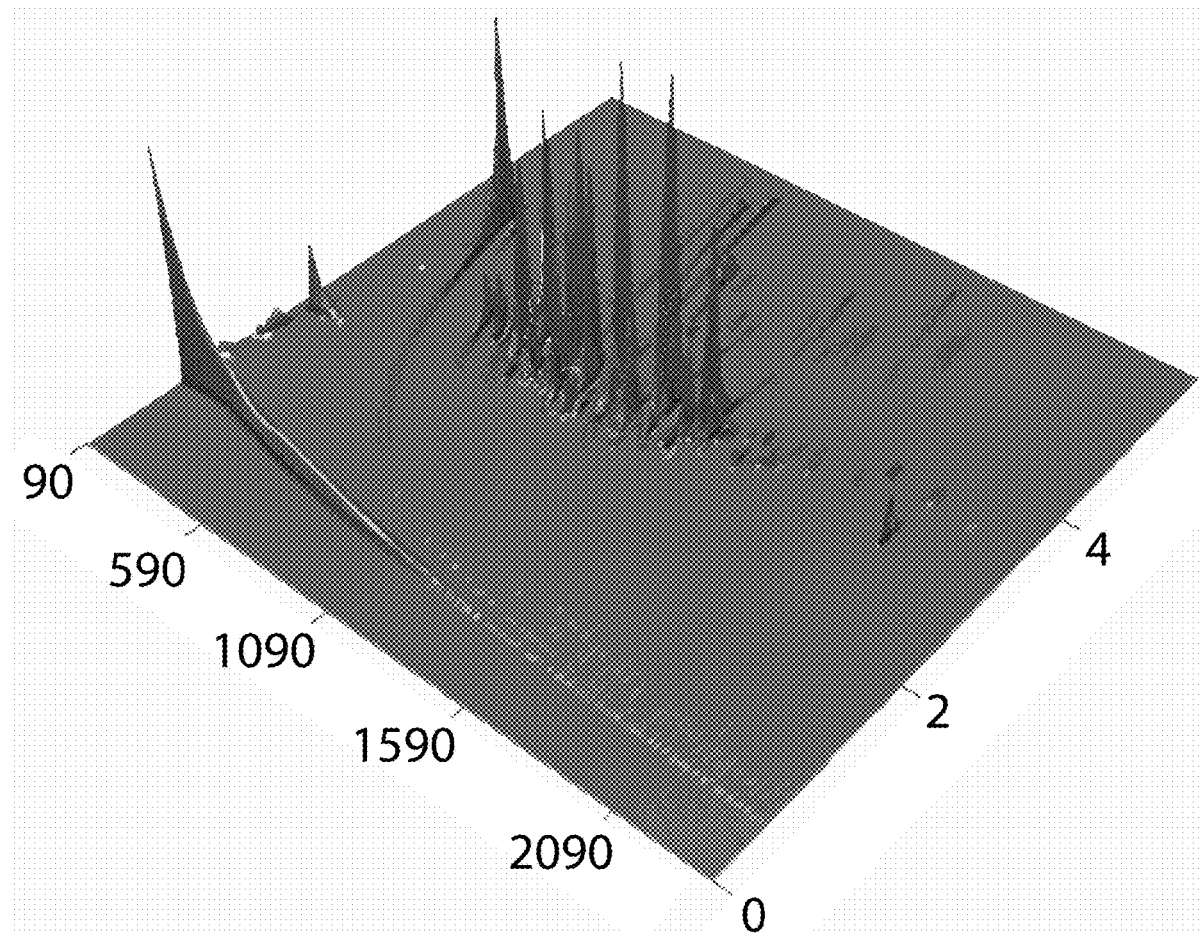

Biomass fast pyrolysis: Referring to FIG. 3, a Vapor Phase Upgrading (VPU) system was composed of two separate units, 1) a pyrolysis reactor, and a 2) Davison Circulating Riser (DCR; i.e. upgrading reactor), both of which could be operated independently or together in an integrated fashion. The biomass feed system included a feed hopper, a lock hopper, a dosing screw/hopper, and a fast feed screw that introduced biomass into the pyrolysis reactor (see A in FIG. 3). A loss in weight feeder delivered biomass (between 1 mm and 2 mm particle size, between 0.5 kg and 1.5 kg dose at 30 kg/hr) into the lock hopper of the biomass feed system. The lock hopper was purged with nitrogen to remove air from the biomass and pressurized to 5 psig over the reactor pressure before the primary feed valve was opened to deliver the biomass to the dosing hopper. In the dosing hopper, the dosing screw metered the biomass onto the fast feed screw at a rate of up to 3 kg/hr into the pyrolysis reactor. The pyrolysis reactor component of the VPU consisted of a 2 inch ID (inside diameter) 316 SS pipe with a length of 40 inches between the biomass inlet and the reactor outlet (see B in FIG. 3). The pyrolysis reactor was fluidized with nitrogen and operated with an internal temperature of 500° C. measured via a thermal well containing a multipoint thermocouple. Pressure was controlled at about 35 psig, and pressure drops across the various unit operations were monitored to ensure a positive pressure over the DCR reactor operated at about 25 psig. For the vapor upgrading experiments, the biomass to nitrogen ratio was about 0.5. A nitrogen fluidization gas flow rate was set to achieve an average residence time of about 2 seconds in the pyrolysis reactor. The reactor system featured two cyclones for char removal (see C in FIG. 3) followed by hot gas filtration to remove alkali and residual char particles (see D in FIG. 3). A slipstream of the hot pyrolysis vapors (at about 400° C.) was directed to the DCR via a three-way diverting valve through a heated 0.25 inch OD (outside diameter), 0.035 inch wall tubing to minimize residence time and cracking of primary pyrolysis vapors. The primary flow of vapors was condensed in a spray tower with dodecane at 25° C. and separated from the resultant two-phase liquid mixture in a horizontal phase separator (see E in FIG. 3).

Vapor catalytic cracking and upgrading: Referring again to FIG. 3, catalytic upgrading of the pyrolysis vapors generated in the pyrolysis reactor from mixed hardwood or pine feed was conducted in a Davison Circulating Riser (DCR), which consisted of three reaction vessels (regenerator, riser, and stripper) as shown in FIG. 3 (see F). The DCR was operated adiabatically, similar to industrial FCC units, and during operation the desired riser temperatures and gas and/or liquid feed rates were set once and maintained throughout an experimental run. Catalyst (about 1.8 kg) was charged into the regenerator and transferred through the system via pressure differentials. Once catalyst reaction temperature was at steady state as measured by a constant riser temperature, hot filtered pyrolysis vapors were fed into the DCR via a heated transfer line (400° C.) into an injection port located at the base of the riser. The catalyst circulation rate (the only source of heat to the riser) vas varied in order to maintain the desired target temperatures. Air was introduced into the regenerator for in situ catalyst regeneration, and the produced flue gas was analyzed to determine coke deposition on the catalyst. The product stream (composed of nitrogen, steam, and hydrocarbons) was sent through a fractional condenser system (composed of a heat exchanger (20° C.), an electrostatic precipitator (ESP), a cold finger (−10° C.), and a coalescing filter), then through a reflux condenser that used a countercurrent down flow of cold product liquids to scrub the product gases swept out from the catalyst steam stripper (see G in FIG. 3). The entire condensed product was allowed to drain and separate into a hydrocarbon phase and an aqueous phase which were analyzed separately. Residual product gases were analyzed by on-line gas chromatography.

Table 5 lists ranges for the DCR parameters utilized in the experiments reported herein. For these experiments, the system pressure was set at 15 psig and the pyrolysis vapor feed rate between 170 g/hr and 240 g/hr (total feed rate of 1 kg/hr, N$_2$ included). The regenerator, stripper, riser outlet, and the feed pre-heater temperatures were set to 600° C., 500° C., 550° C., and 150° C., respectively.

TABLE 5

DCR operational parameters

| Operating Parameter | Effective Range |
|---|---|
| Biomass feed rate | 1-4 kg/hr |
| Riser temperature | 450-600° C. |
| Riser pressure | 1.0-3.0 atm |
| Stripper temperature | 500-550° C. |
| Regenerator temperature | 600-700° C. |
| Solid circulation rate | 5.5-10 kg/hr |

TABLE 5-continued

DCR operational parameters

| Operating Parameter | Effective Range |
|---|---|
| Solid inventory | 1.5-2 kg |
| Fluidization gas rate | N |
| Vapor residence time | S |

Note:
N is between 1-6 kg/hr for the pyrolyzer, and 200-800 SLPH for the DCR; S is between 1-2 seconds in the pyrolysis reactor, and between 0.5-5 seconds in the riser.

Product analysis: Condensed pyrolysis oils collected from the pyrolysis reactor and upgraded pyrolysis liquids collected from the DCR fractional condensation train were comprehensively analyzed for chemical composition with methods comprising moisture content, ultimate and proximate analysis, carbonyl content, carboxylic acid number (CAN), simulated distillation (SIM DIST), total acid number (TAN), $^{13}C$ NMR, and comprehensive two dimensional gas chromatography time of flight mass spectrometry (GCxGC-TOFMS).

Moisture content was determined by titration with standardized Karl-Fisher reagent on a Metohm 701 KF Titrino automatic titrator. Hydranal® 5K was used as the titrant and was standardized against a NIST traceable water standard. Samples were vigorously shaken for 60 seconds to 90 seconds to suspend any heavy material that had settled before aliquoting. Approximately 100 µL of oil was transferred to the KF vessel which was preconditioned to an anhydrous condition and titrated to the instrument end point. Each sample was measured in triplicate. Elemental compositions were determined by combustion analysis using a LECO TruSpec® CHN analyzer. Oxygen was determined by difference. Calibration of the CHN analyzer is with a known standard (EDTA).

An original carbonyl analysis method developed by Faix (ASTM E3146) was modified to increase sample size and decrease reactant volumes. Samples were reacted with hydroxylamine hydrochloride in ethanol and the liberated hydrochloric acid was reacted with an excess triethanolamine solution. Unreacted TEA was then titrated with standardized hydrochloric acid to determine the amount of hydroxylamine hydrochloride originally consumed which was equivalent to the amount of carbonyl groups present. The estimated detection limit was near 0.1 mol carbonyl group/kg oil. The CAN was determined by pH titration with a Metrohm 842 Titrando automatic titrator using Nicolaides' method. Samples were weighed into titration cups, diluted to 40 ml with 80% ethanol/water and titrated to a of 13 with standardized NaOH. The acid end point was determined by the first derivative of the pH. The pKa of organic acids is not highly variable in different organic acids. Standard potassium hydrogen phthalate and salicyclic and anisic acid carboxylic acids of known concentration were used to validate the method.

$^{13}C$ NMR analysis was conducted by dissolving standards, oil and upgraded products samples (200 µl) in CDCl3 (250 µl) with 1 mg/ml chromium (III) acetylacetonate as relaxation reagent. All $^{13}C$ NMR spectral data were recorded with a Bruker 600 MHz NMR spectrometer.

Two-dimensional gas chromatography time of flight mass spectrometry (GCxGC-TOFMS) analysis was conducted with a LECO Pegasus unit equipped with a Gerstel autosampler. Instrument parameters are shown in Table 6. Samples were diluted 1:10 in acetonitrile containing (trifluormethyl) benzene, 2-fluorobiphenyl, and o-terphenyl used as system monitoring compounds. Data analysis was conducted using LECO ChromaTOF version 4.51.6. Group type analysis was determined based on representative compounds and second dimension retention times. Quantitation of compound groups was conducted by applying response factors of representative compound classes detected in catalytic pyrolysis oils. The list of compounds used to evaluate retention times and calibrate TOF MS response are provided in Table 7. Compounds identified by library search and 2D retention times were binned into their respective compound classes in an Excel spreadsheet. Concentrations were calculated as mass % which were normalized for each subclass of compounds for ease of comparison between oil types and subclasses. Post-condensation product gases were analyzed using an Agilent Technologies 490 Micro gas chromatograph, using MS5A (10 m), PPQ (10 m), AlOx (10 m), and 5CB (8 m) columns.

TABLE 6

GC × GC TOFMS Instrument Parameters

| Column | | | |
|---|---|---|---|
| Primary | Rtx-5, 10 m × 180 µm × 0.18 µm | | |
| Secondary | DB-1701, 1.0 m × 100 µm × 0.10 µm | | |
| Injector | | | |
| 1.0 µL injection, split 200:1 | 300° C. | | |
| Oven | | | |
| Primary | 35° C., hold 7 min, ramp 5° C./min to 255° C. | | |
| Secondary | 10° C. offset from primary | | |
| Modulator | 15° C. offset from secondary | | |
| | modulator period, sec | hot time, sec | cold time, sec |
| Modulator cycle timing | | | |
| start-end of runtime | 6 | 1.0 | 2.0 |
| Mass Spectrometer | | | |
| Transfer line | 250° C. | | |
| TOF mass range | m/z 29-350 | | |
| TOF acquisition rate | 200 spectra/sec | | |
| Solvent delay | 54 s | | |

TABLE 7

GC × GC TOFMS Calibration Compounds
Compounds used to calibrate TOF MS response

| | |
|---|---|
| Benzene | p-Cresol |
| Methyl cyclohexane | o-Methoxyphenol |
| 2,5-Dimethylfuran | Naphthalene |
| Toluene | Phenanthrene |
| 2-Cyclopenten-1-one | Tetralin |
| p-Xylene | n-Nonane |
| 1,3,5-Trimethylbenzene | 1-Octene |
| Phenol | n-Decane |
| 2,3-Dihydrobenzofuran | n-Tetradecane |
| Indene | |

RESULTS

Comprehensive chemical analysis of fast pyrolysis (FP) oils, catalytic fast pyrolysis (CFP) oils, and gasoline product from VGO and/or VGO cofed with pyrolysis oil was used to understand how oil composition varies with feedstock and catalyst. The aqueous phase from the CFP oils were also characterized as the biogenic carbon it contains is an upgradeable source of biomass-derived fuels and chemicals. Primary oil analysis was conducted with GCxGC-TOFMS and $^{13}$C NMR to characterize individual species and carbon bond types, respectively. Simulated distillation (SIM DIST) was used to compare boiling behavior of the liquids. On-line gas chromatography provided permanent gas analysis of the vapor feed to the DCR and post-condensation product gas analysis. Fast pyrolysis (FP) and CFP oils and the control gasoline product obtained from VGO and E-Cat showed significant differences as expected. FIGS. 4A-4D illustrate GCxGC-TOFMS chromatograms of the upgraded pyrolysis oils and gasoline range hydrocarbon product: liquid VGO upgrading with equilibrium catalyst (E-Cat) via the DCR system (Product C in Table 1), the baseline experiment to produce gasoline, is E-Cat and VGO (see FIG. 4B); the upgrading experiments with pine (P) or mixed hardwood (MHW) fast pyrolysis vapors (Product A in Table 1) were conducted with the Johnson Matthey CP758 zeolite catalyst and are designated as CP758-P (see FIG. 4A) and CP758-MHW (see FIG. 4D); the upgrading experiment pine and the Johnson Matthey CP783 catalyst (also Product A in Table 1) is designated as CP783-P (see FIG. 4C). The three CFP oils were similar, with hardwood producing slightly more oil than pine. The VGO product chromatogram is similar to gasoline and shows characteristic hydrocarbons (paraffinics) and aromatics. The two large peaks along the upper left edge of the CFP oil chromatogram correspond to xylene and toluene, which selectively form with these HZSM-5-based catalysts and clearly show increased aromatic production. The absence of oxygenates seen in the upper left quadrant of each plot is notable though a few oxygenates (phenols) appear in the CP783-P chromatogram.

Figure 5A:
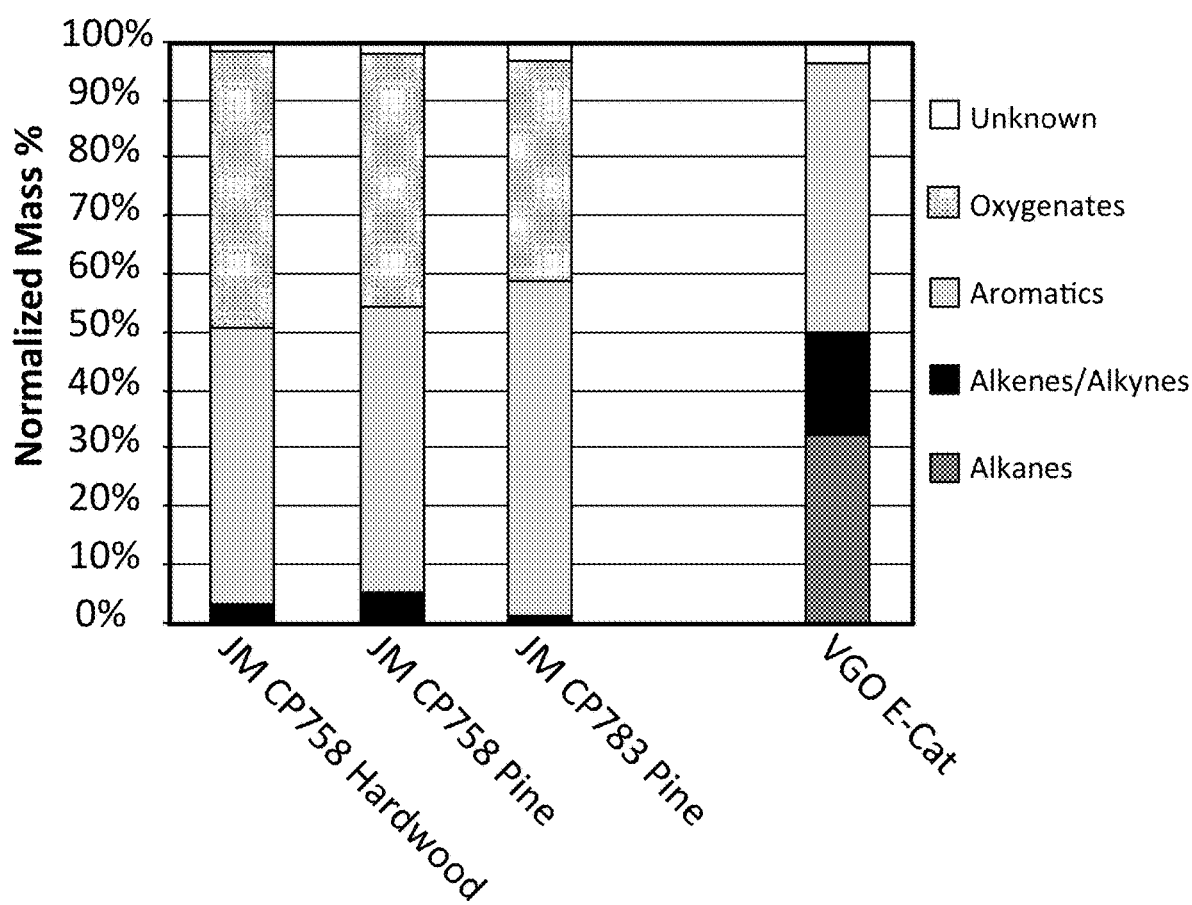
FIGS. 5A-5F illustrate product distributions, as normalized weight percentages, according to GCxGC-TOFMS analysis resulting from different raw materials (CFP oil derived from oak or pine, or VGO) used in the pyrolysis reactor and catalyst choice (JM CP758 or JM CP783) in the upgrading reactor (DCR), according to some embodiments of the present disclosure (resulting in CFP oils).

Analyzing the more than 400 compounds present in each of these samples was very complex. Compound identification from mass spectra matching software, peak size, and retention times for each resolved compound were tagged with CAS registry numbers to generate a searchable Excel-based spreadsheet to 1) quantitate species in the samples and 2) group compound classes. FIGS. 5A-5F illustrate the compound distributions resulting from the experiments described above, resulting from an analysis of the mass spectral data from chromatograms shown in FIGS. 4A-4D: general compound classes (see FIG. 5A), aromatic compounds (see FIG. 5B), oxygenates (see FIG. 5C), 1-ring aromatic hydrocarbons (see FIG. 5D), carbonyls (see FIG. 5E), and phenols (see FIG. 5F). Note for FIGS. 5A-5F, that the fourth space for a column is purposefully left blank to indicate that the materials to the left (pyrolysis oils) are fundamentally different from the single column to the right (VGO). VGO was not analyzed for comparison to pyrolysis oils in FIGS. 5C, 5E, and 5F, for the reasons provided below. Referring to FIG. 5A, oils from both feedstocks and the CP758 catalyst are similar in composition with respect to general compound classes and aromatic hydrocarbons with significantly less alkanes and alkenes/alkynes formed compared with VGO. Oxygenates were less abundant in the CP783 CFP, indicating CP758 has less deoxygenation capacity. The use of CP783 zeolite in the DCR to upgrade pine oil produced more unknown compounds compared with pine oil upgraded using CP758 zeolite in the DCR.

Figure 5B:
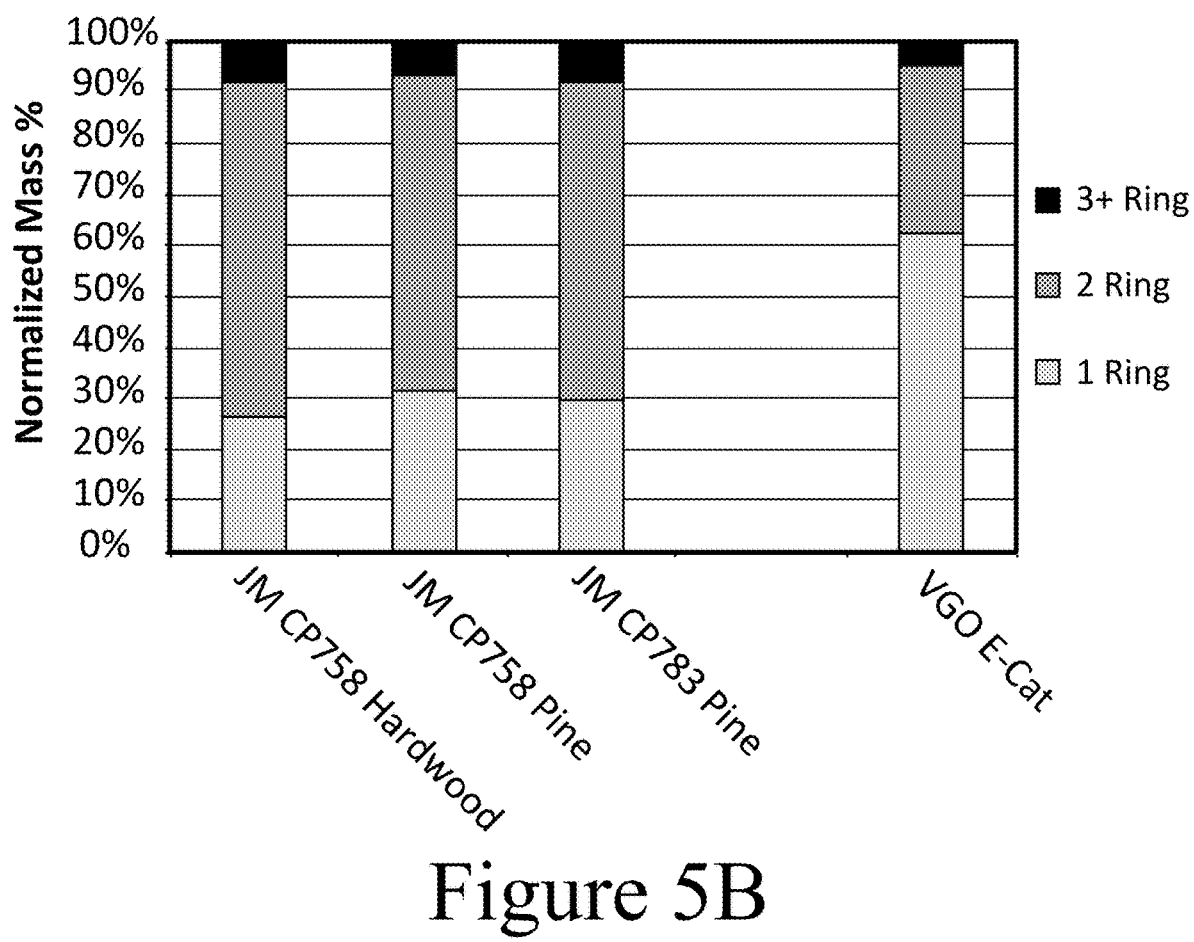
Figure 5C:
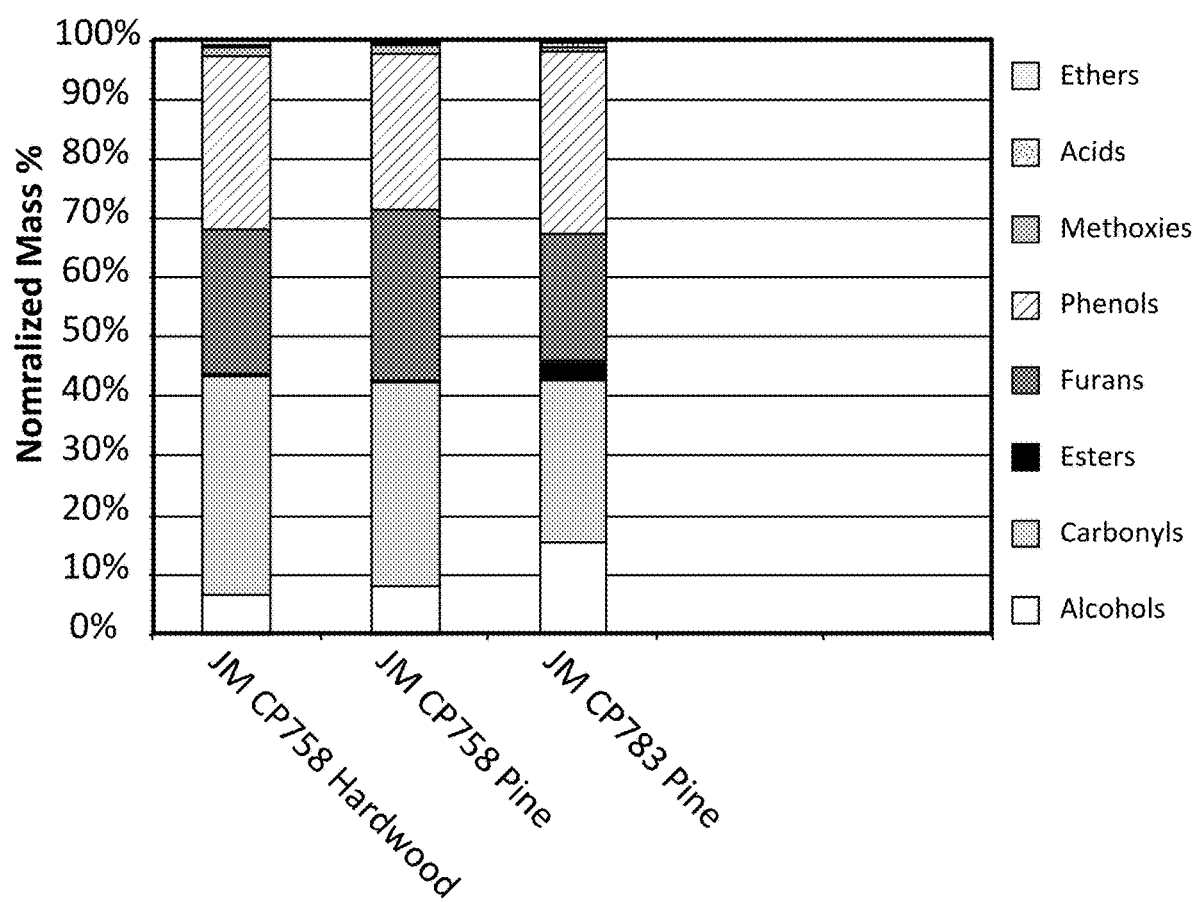

Referring to FIG. 5B, the CFPs contained a lower abundance of 1-ring aromatics and higher abundance of 2-ring aromatics, compared to what was obtained from the upgrading of VGO. Referring to FIG. 5C, more alcohols and phenols and less furans and carbonyls were produced with the CP783 upgrading catalyst. Also notable is that none of the pyrolysis oils showed significant production of methoxies, acids, or ethers. Also, CP783 produced significantly more esters than the other two pyrolysis oils. VGO is not shown in FIG. 5C, because, as shown in FIG. 5A, VGO did not result in any appreciable amount of oxygenate formation.

Figure 5D:
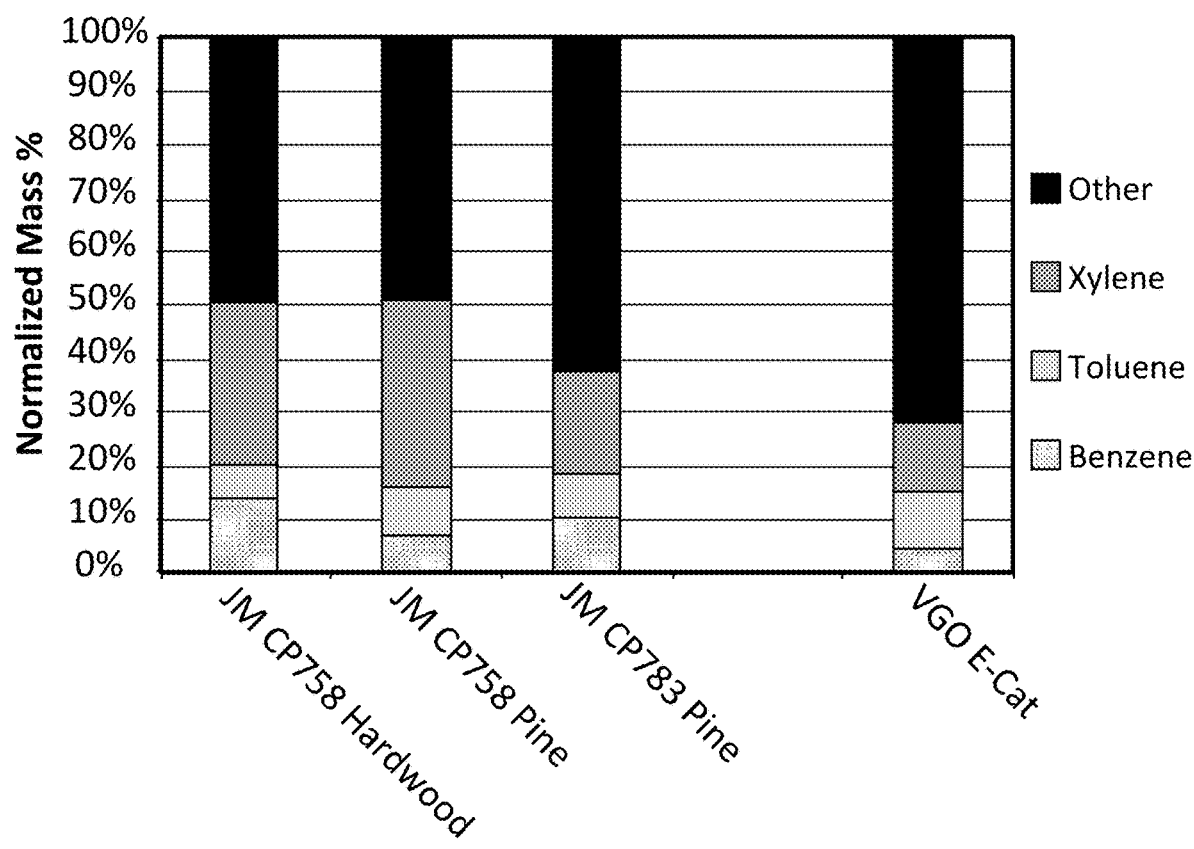
Figure 5E:
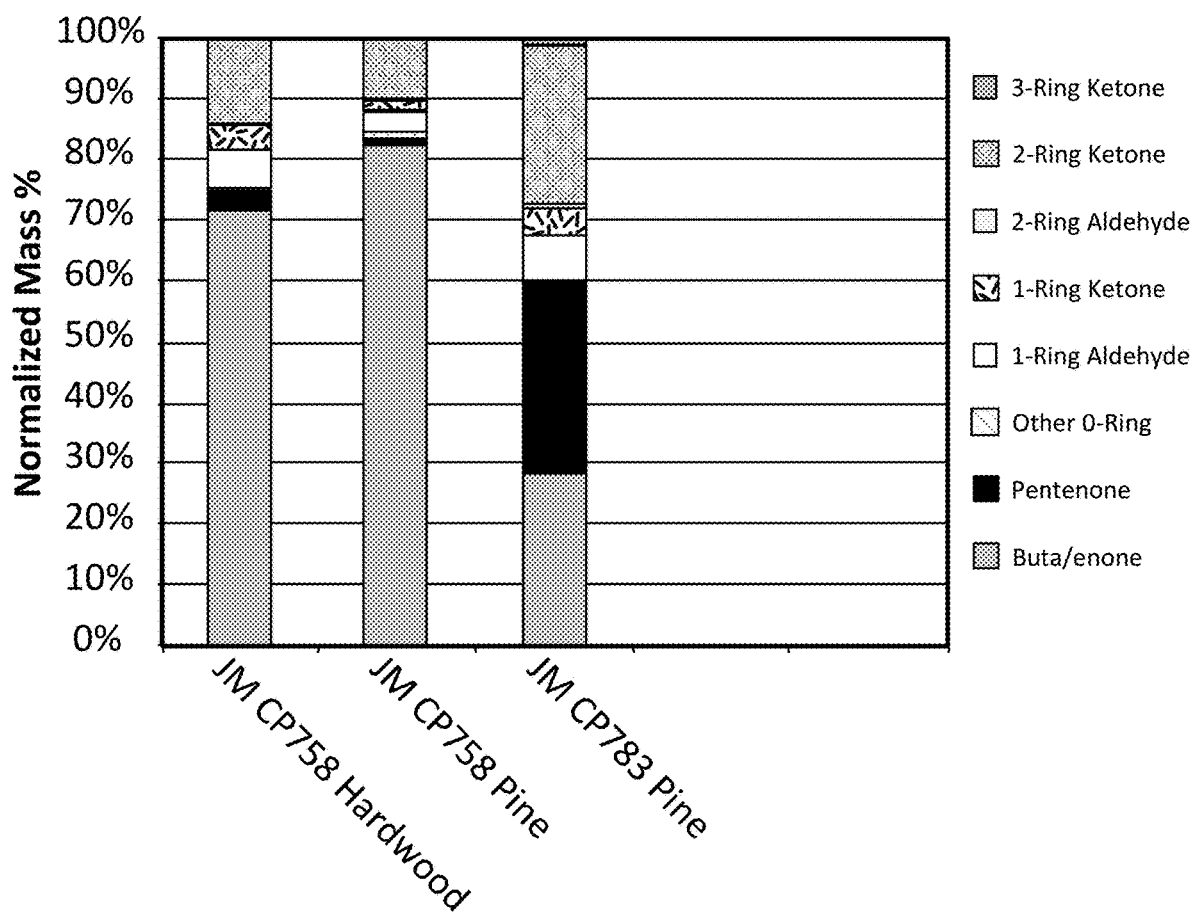
Figure 5F:
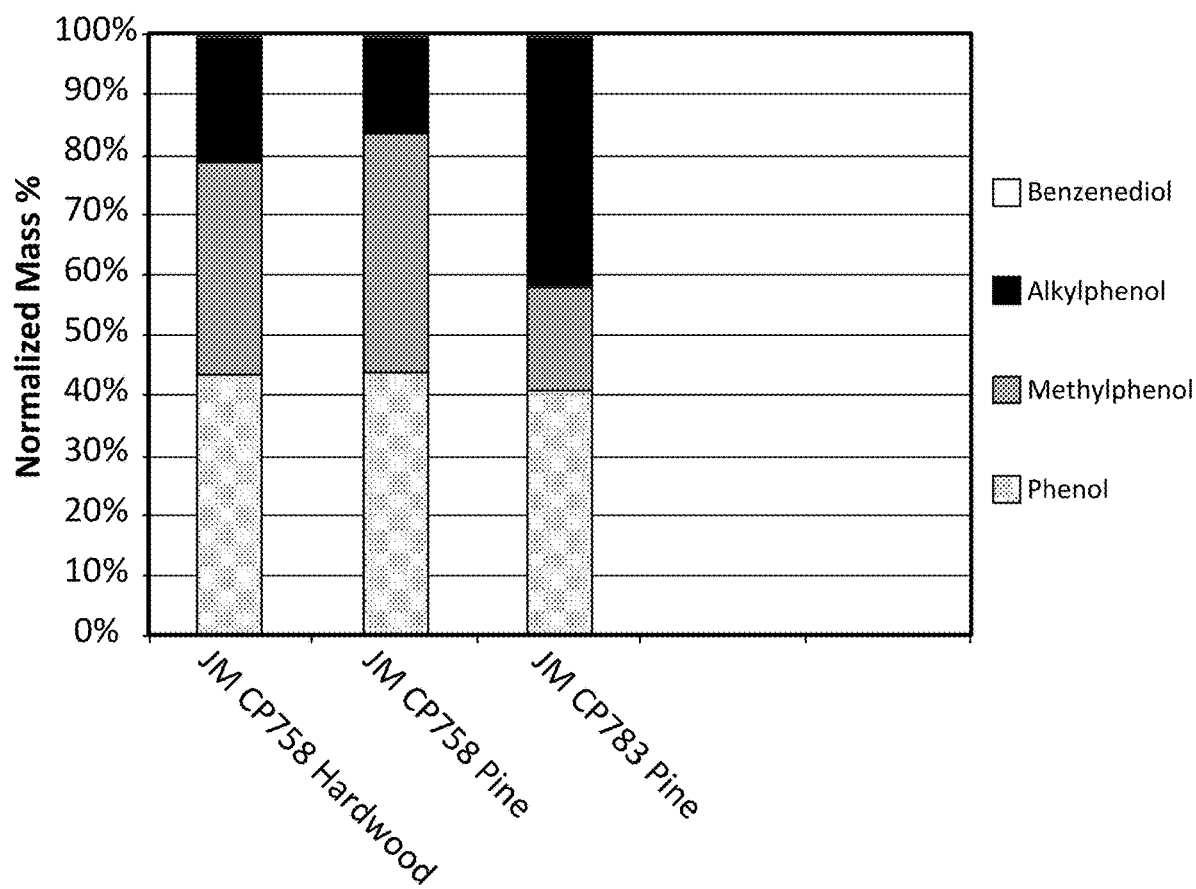

FIG. 5D compares 1-ring aromatics in the CFP oils to those in VGO. Overall, the benzene and toluene content of VGO was reduced compared to these compounds in the CFP oils. Within the CFP oils, oak and pine oils made with CP758 catalyst showed that oak oil contained increased toluene and reduced xylene compared with the pine oil, while the unknown content remained unchanged. Pine CFP oil produced with the two zeolite catalysts, CP758 or CP783, showed increased toluene and xylene compared with oil from CP783. Increased toluene and xylene content has implications for use in renewable plastics. FIG. 5E shows the carbonyl contents of the CFP oils. VGO product does not contain any oxygenates. Oak and pine CFP oils produced with CP758 show enhanced buta/enone content>70 normalized mass %. This is a significant result that has implications for separation of valuable co-products from these oils. Catalyst impact on the pine CFP oils was significant with >30 normalized mass % pentenone contained in oil produced from CP783 with a concurrent reduction in buta/enone content. FIG. 5F shows phenol content among the CFP oils. The impact of feedstock was negligible with oak and pine oil produced from CP758, though a slight enhancement of methyl phenol was observed in the pine CFP oil. Catalyst impact was more pronounced with CP783 zeolite producing more alkyl phenol and less methyl phenol than CP758.

Figure 6:
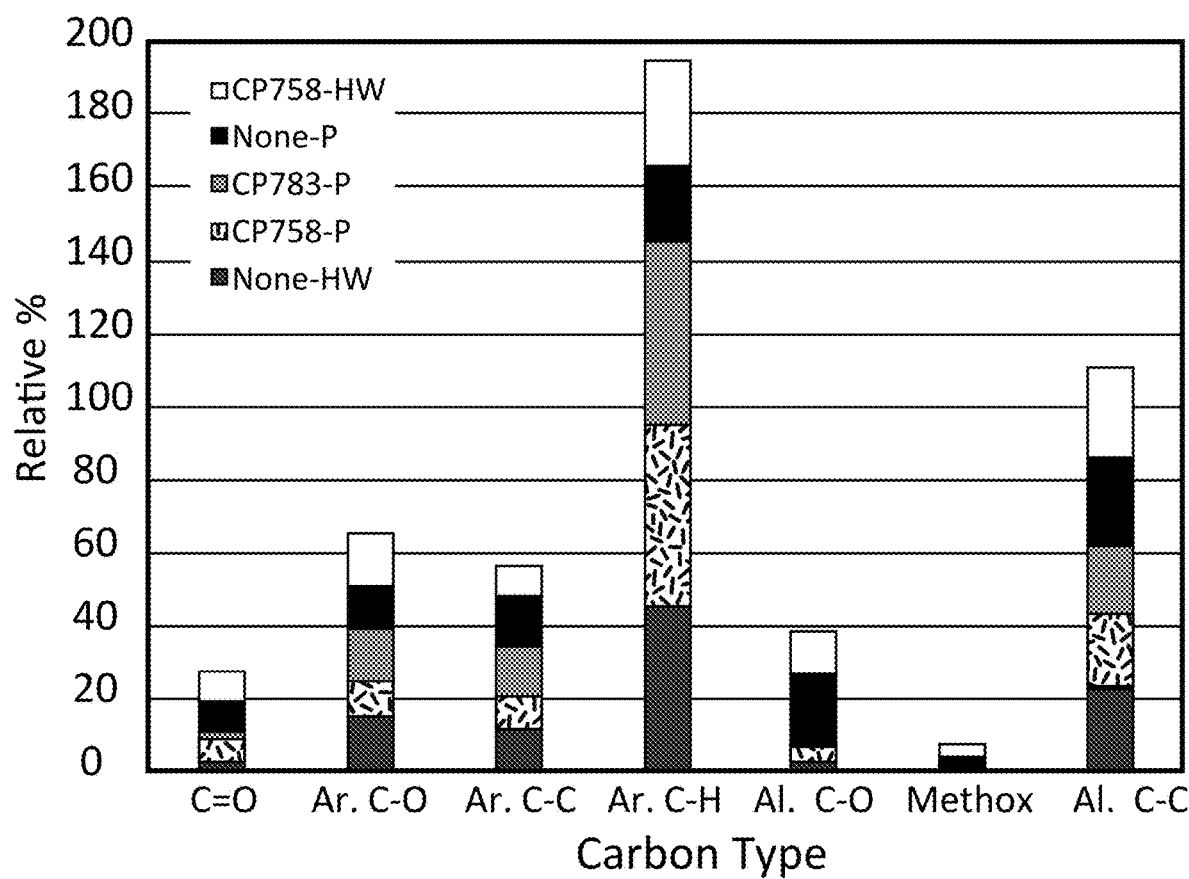
FIG. 6 illustrates $^{13}C$ NMR analysis of CFP oils and upgraded VGO liquid product, according to some embodiments of the present disclosure.

Carbon bond types as determined by $^{13}$C NMR are shown in FIG. 6 for both upgraded vapor phase CFP oils and the condensed fast pyrolysis oil from unused vapors. The NMR analysis generally agreed with the GCxGC-TOFMS analysis with significant increases obtained in aromatic hydrocarbons (designated as Ar. C—H) in the upgraded CFP oils compared to untreated (not upgraded) pyrolysis oils. Striking reductions in oxygenates comprising C=O and aliphatic C—O species in the CFP oils were also observed. With respect to pyrolysis reactor feedstocks and CFP oil chemistry, less C=O and aliphatic C—O containing compounds and slightly more aromatic C—O and C—C and aliphatic C—C compounds were produced with hardwood compared to pine. Hardwood derived untreated (not upgraded) pyrolysis oil contained slightly more aromatic C—O and C—H compounds than pine derived oil, which in turn contained more aromatic C—C and aliphatic C—O species.

Figure 7:
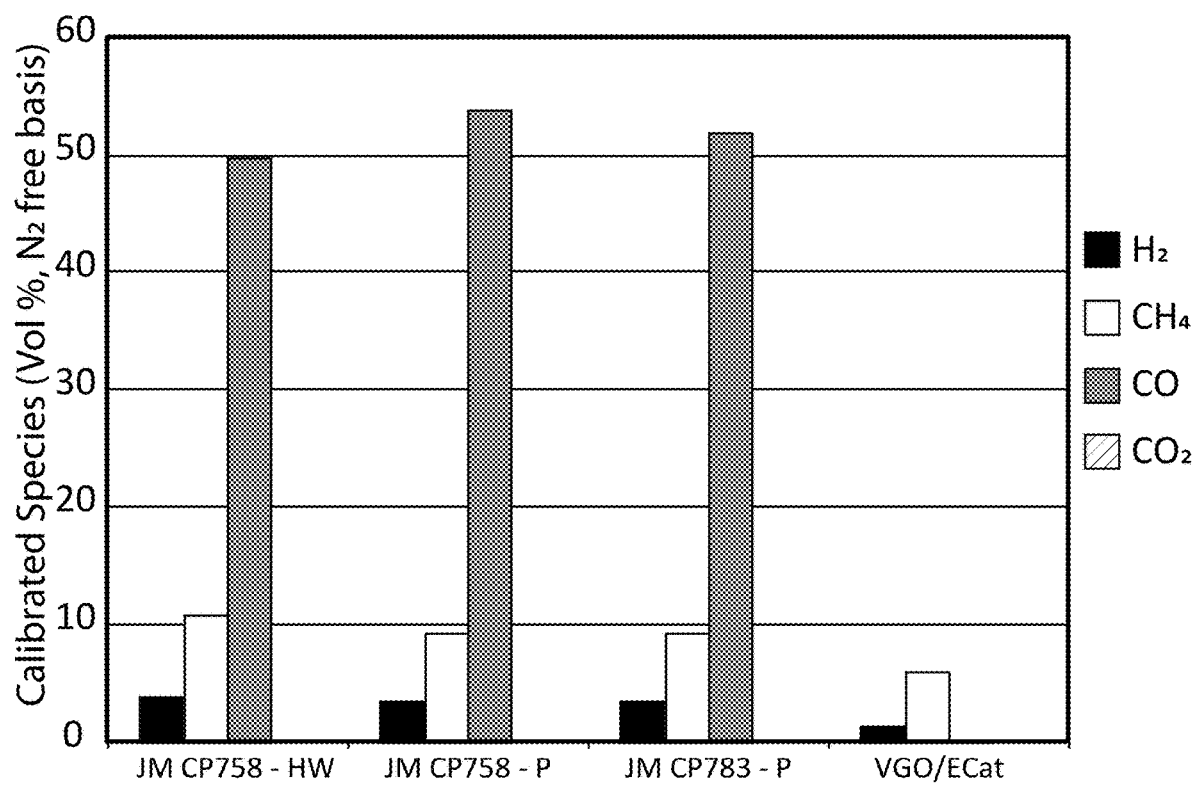
FIG. 7 illustrates permanent gases produced during steady state catalytic upgrading of pine and hardwood pyrolysis vapors, according to some embodiments of the present disclosure. Pure VGO upgrading with E-Cat is shown for comparison.
Figure 8:
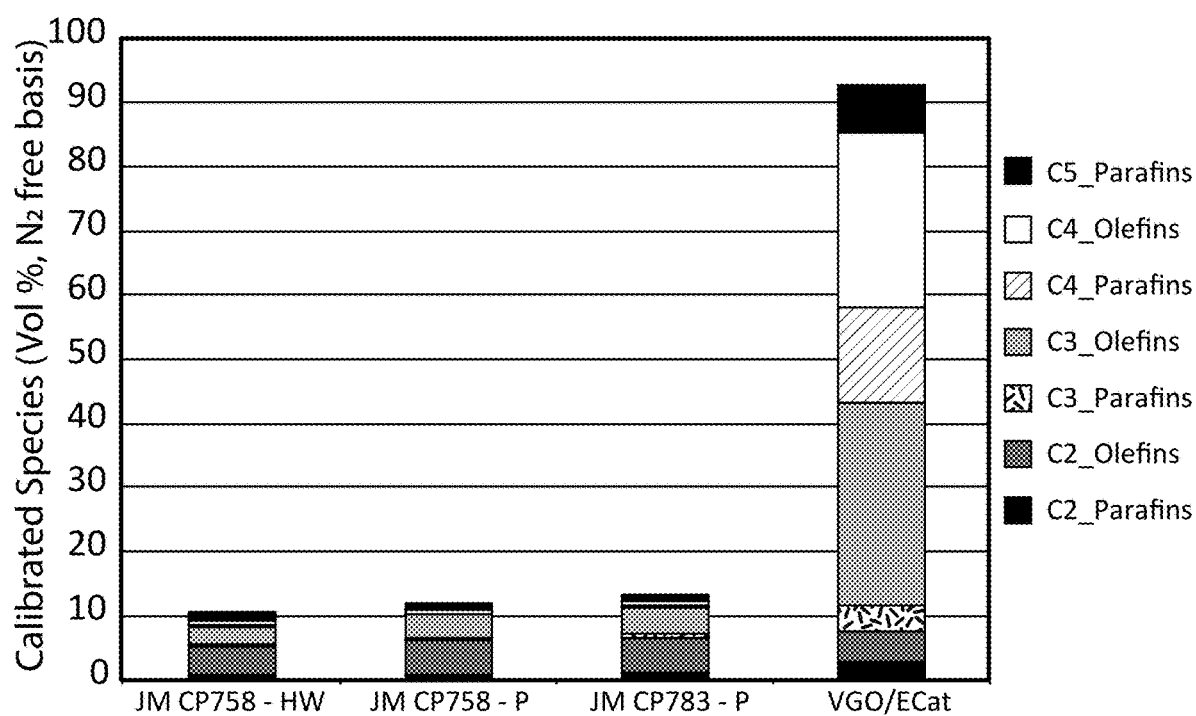
FIG. 8 illustrates hydrocarbon gases produced during steady state upgrading of pine and hardwood pyrolysis vapors, according to some embodiments of the present disclosure. Pure VGO upgrading with E-Cat is shown for comparison.

On-line analyses of the post-condensation gas phase products (permanent and light hydrocarbon gases) are shown in FIGS. 7 and 8 with results reported on a $N_2$-free basis. Permanent gas concentrations based on the upgrading of CFP were higher than those obtained from the upgrading of VGO and similar to each other, which correlates with the similar chromatograms shown in FIGS. 4A-4D. The amount of permanent gases was similar for the various CFP runs, which also contained CO, $CO_2$ and $CH_4$ from the pyrolysis vapor feed (Table 8). As VGO does not contain oxygen, CO and $CO_2$ were not produced during upgrading. The VGO/E-Cat experiment showed a larger concentration of light gases ($C_2$-$C_5$) than was seen in the vapor feed experiments (see FIG. 8). This is likely due to the higher concentration of usable carbon in VGO feed compared to the vapor feeds.

TABLE 8

| Permanent gas concentration in the DCR vapor feed | | | |
|---|---|---|---|
| Pyrolyzer Gas (vol %) | $CH_4$ | CO | $CO_2$ |
| Mixed Hardwood | 1.58 | 4.21 | 2.96 |
| Pine | 1.27 | 3.61 | 2.25 |

Figure 9:
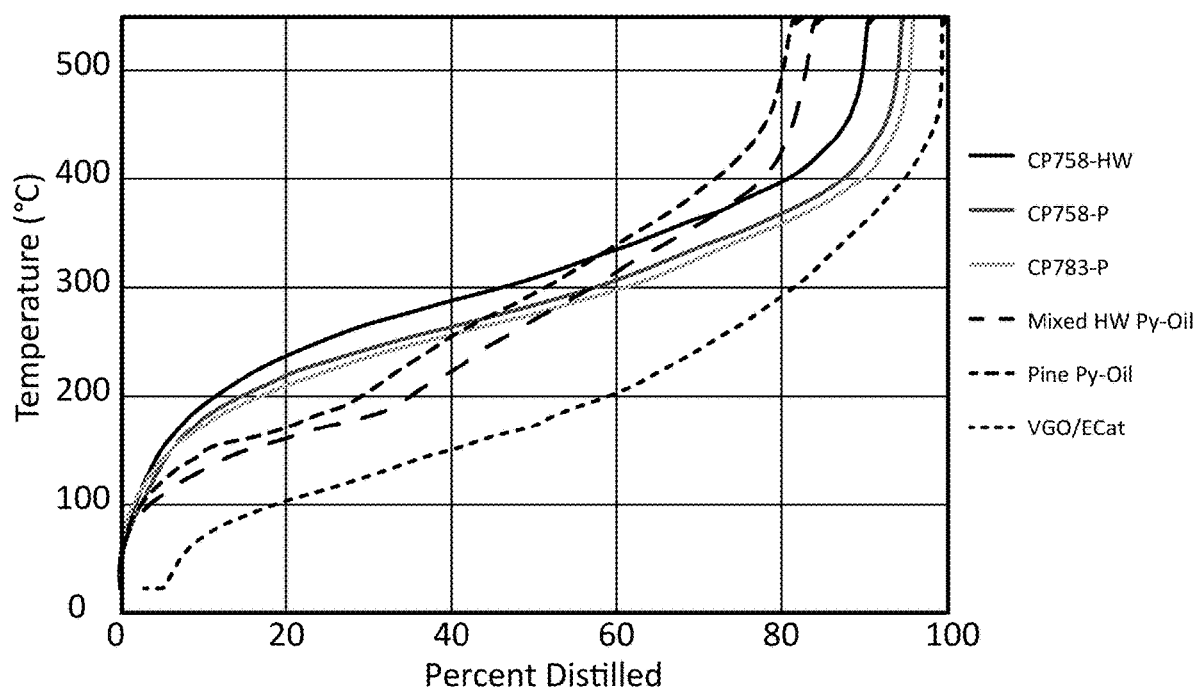
FIG. 9 illustrates a thermogravimetric analysis (TGA) based simulated distillation plot (SIM DIST) of filtered pyrolysis oils from pine and mixed hardwood, upgraded pyrolysis oils, and VGO, according to some embodiments of the present disclosure.

Gas phase hydrocarbon species resulting from the upgraded CFP oils were predominantly $C_2$ and $C_3$ olefins with little difference observed between the various CFP feedstocks and upgrading catalysts used in the DCR. This result is consistent with the similar CFP chromatograms of FIGS. 4A-4D. In contrast, the VGO product contained primarily $C_3$ and $C_4$ olefins along with $C_4$ and $C_5$ paraffins; $C_2$ olefin content was similar to those found in the upgraded CFP oils. The concentration difference may be attributed to the higher carbon density of the liquid VGO feed compared with the vapor carbon content. Composition differences are presumably due to the VGO feed comprising 75% of approximately equal amounts of aromatics, isoparaffins and olefins and about 25% paraffins, naphthenics and other species. SIM DIST was used to characterize the VGO upgraded product (gasoline range hydrocarbons), raw pyrolysis oils, and CFPs. FIG. 9 shows that the VGO/Ecat product contained significantly more volatile species than the raw pyrolysis or CFP oils, which is consistent with the high concentration of oxygenates in the bio-oils. Additionally, the raw pyrolysis oils contained more volatile content early in the distillation curve and more heavy species later in the curve than the CFPs. This is indicative of the lower water content of CFPs (lower volatility early in the curve) and deoxygenation of higher molecular weight components (higher volatility later in the curve) relative to raw pyrolysis oils.

Figure 10:
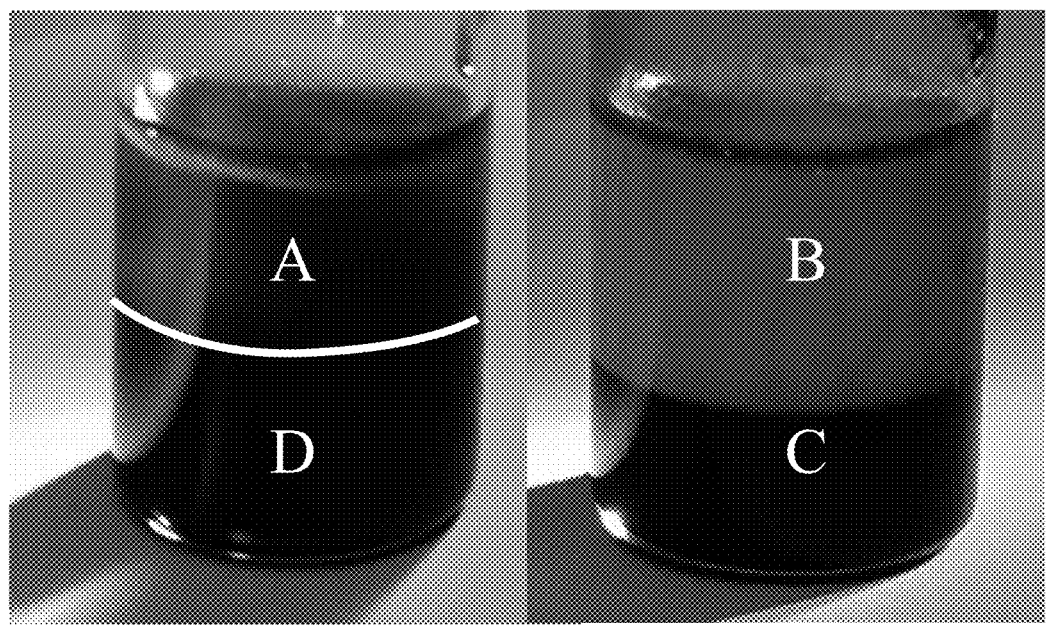
FIG. 10 illustrates a 50/50 vol % mixture of pine CFP oil with VGO (50 vol %, CFP oil and 50 vol % VGO) before mixing (left panel) and after mixing and phase separation (right panel). A is "pure" VGO; D is "pure" CFP oil; B is "enhanced" VGO after mixing and separating, which experienced a 25% volume increase due to the migration of CFP components into the VGO layer; and C is the CFP oil remaining after mixing and phase separation, according to some embodiments of the present disclosure.

Miscibility and Characterization of Biomass Catalytic Fast Pyrolysis Liquids with Petroleum Vacuum Gas Oil (VGO): The experiments described below investigate the miscibility of CFP oils with VGO, by mixing the two phases together and allowing them to phase separate. The mixtures were produced by mechanical mixing. In some embodiments of the present disclosure, a single liquid stream containing a first fraction of VGO and a second fraction of a CFP oil may be fed directly to an upgrading reactor, as described above, and described in more detail below. As shown in FIG. 10, mixing VGO with a CFP oil produced an enhanced VGO phase that contained compounds originally contained in the CFP oil. In some embodiments of the present disclosure, such an enhanced VGO phase may be fed directly to an upgrading reactor to produce biogenic carbon containing hydrocarbons.

Figure 11A:
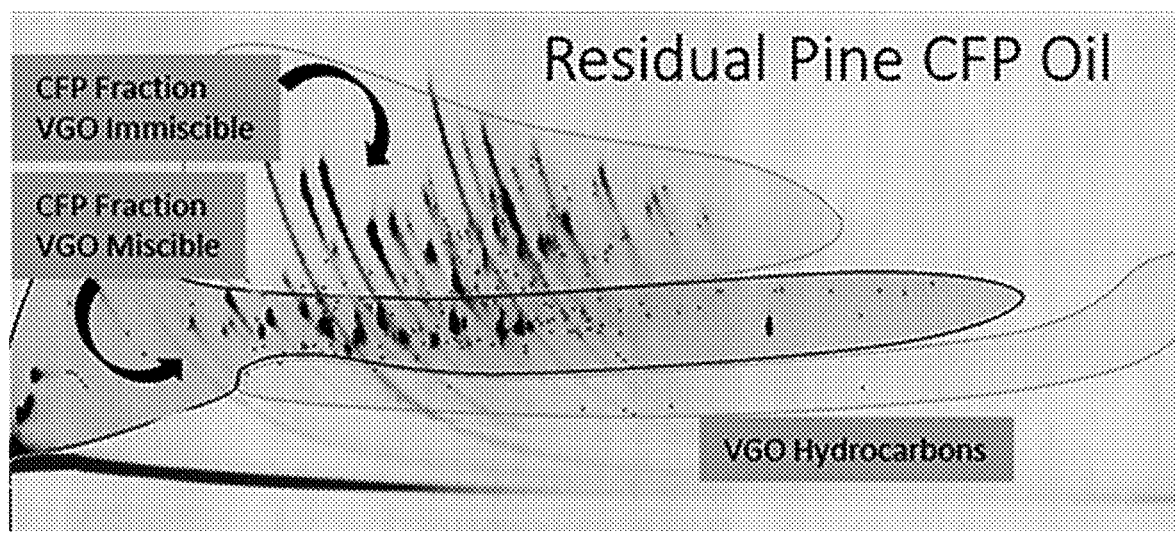
FIGS. 11A, 11B, and 11C illustrate 2D chromatograms.
Figure 11B:
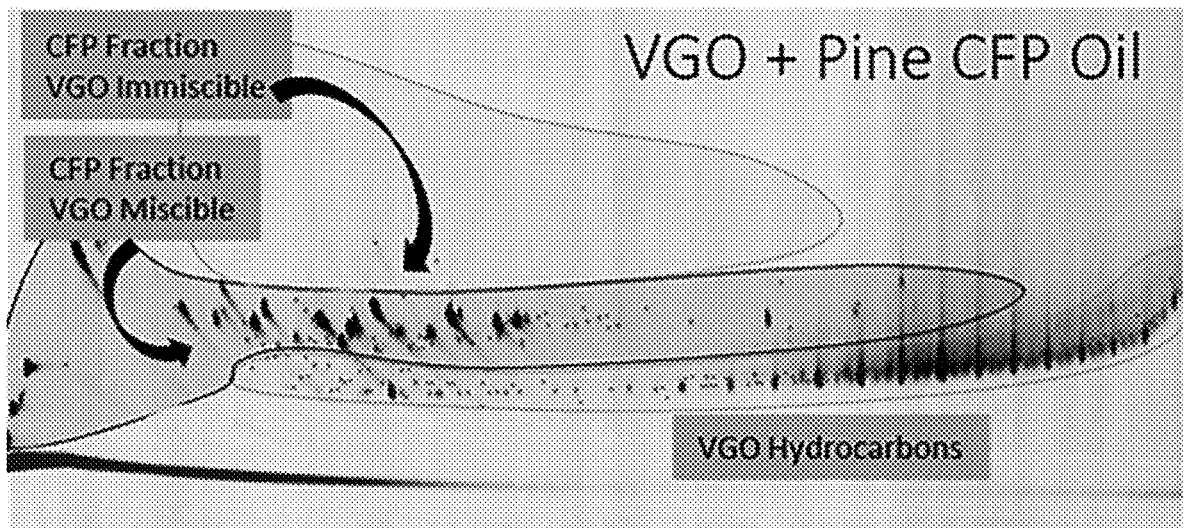
Figure 11C:
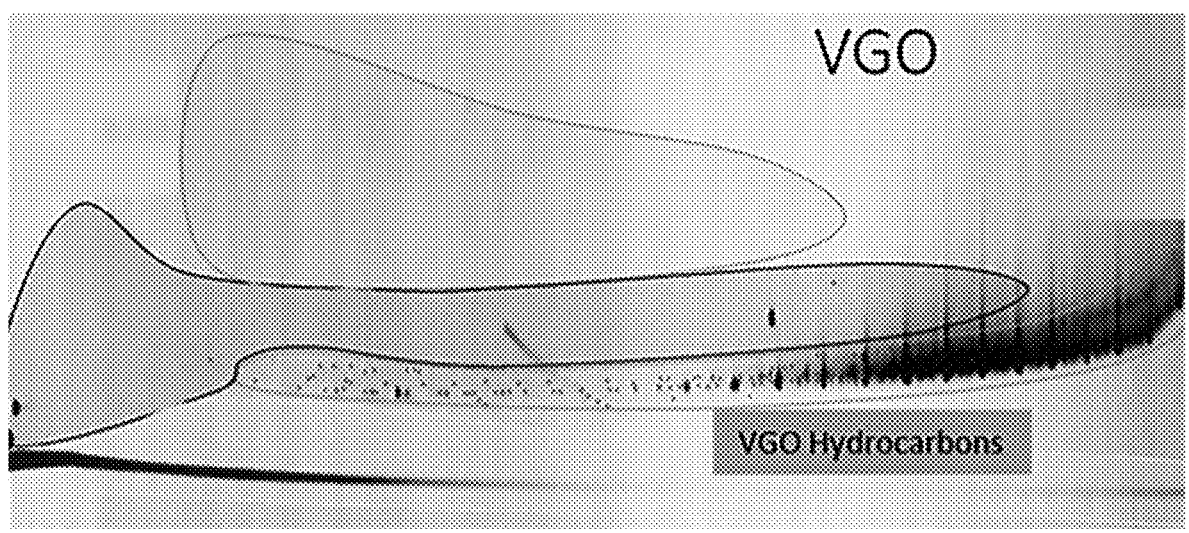

FIGS. 11A, 11B, and 11C illustrate GCxGC-TOFMS chromatograms for some of the phases shown in FIG. 10. FIG. 11A illustrates the results obtained from the resultant, heavy-phase CFP oil (phase D) after mixing with the lighter phase VGO and phase separation (liquid phase C of FIG. 10). FIG. 11B illustrates the results of the resultant "enhanced" VGO, now containing CFP compounds (liquid phase B of FIG. 10). FIG. 11C illustrates the results for the "pure" starting VGO (liquid phase A of FIG. 10), before mixing and phase separation. The "pure", starting VGO contained characteristic short to long chain paraffinic hydrocarbons. The chromatogram of the CFP-enhanced VGO (see FIG. 11B) clearly shows the presence of CFP oil species consisting of aromatics and longer chain hydrocarbons in the enhanced VGO. Additionally, the higher molecular weight components of this layer are phenolics and multi-ring aromatics. Note that these compounds may be used as a single feedstock to an upgrading reactor and/or as a feedstock for chemicals production i.e, phenolic resins. The residual CFP oil (see FIG. 11A) still contained some of the species that migrated into the enhanced VGO layer (see FIG. 11B), suggesting that sequential extraction with VGO may further increase the amounts of biogenic species contained in the resultant enhanced VGO.

Figure 12:
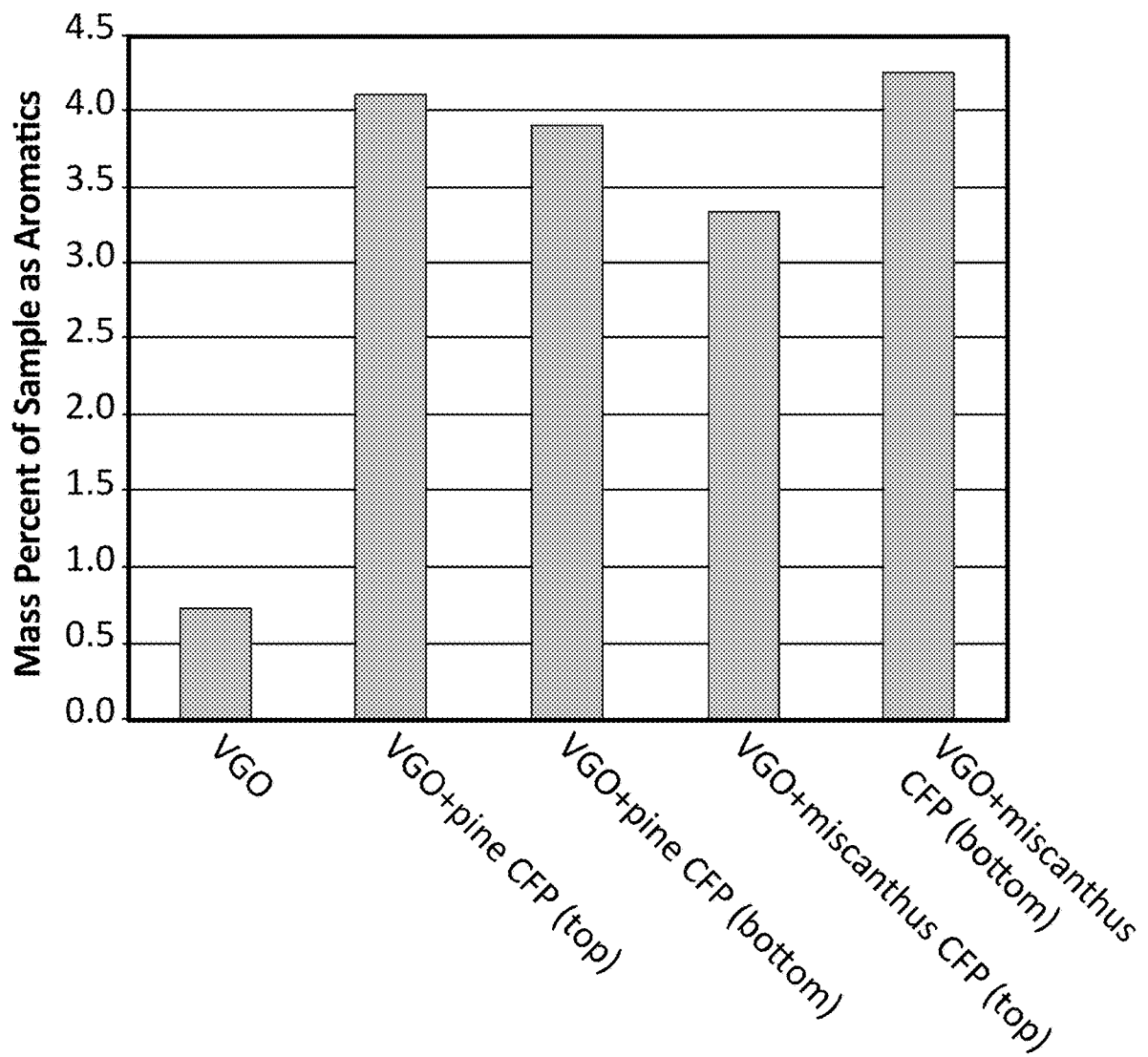
FIG. 12 illustrates the aromatic contents, as mass percentages, determined from GCxGC-TOFMS data of the top layer (i.e. enhanced VGO) and bottom layer resulting after mixing and phase separating various CFP oils (pine and Miscanthus) with pure VGO, according to some embodiments of the present disclosure.
Figure 13:
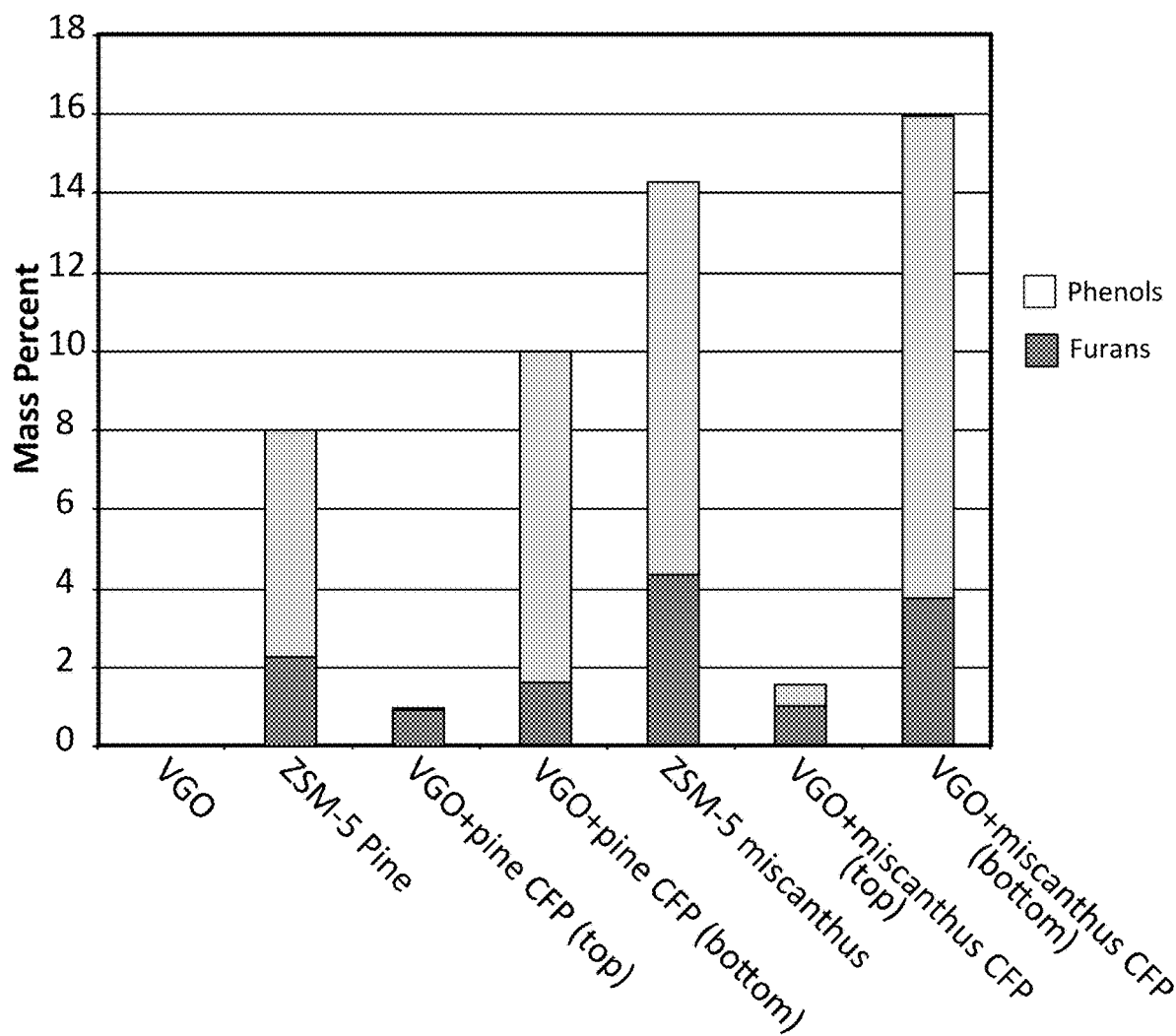
FIG. 13 illustrates the furan and phenol contents, as mass percentages, determined from GCxGC-TOFMS data of the top layer (i.e. enhanced VGO) and bottom layers resulting after mixing and phase separating various CFP oils (pine and Miscanthus) with pure VGO, according to some embodiments of the present disclosure.

FIG. 12 focuses on the aromatics content of the GCxGC-TOFMS data of FIGS. 11A-C, and including data obtained from similar experiments/analysis completed with miscanthus-derived CFP oils. Again, these data were collected after mixing VGO with a CFP oil and allowing phase separation to occur. The lighter enhanced VGO layers (referred to in FIG. 12 as "top") for both feedstocks contained increased aromatics. The residual heavier CFP layers (referred to in FIG. 12 as "bottom") also contain more abundant aromatics compared to pure VGO, but this is due to insufficient transfer of these compounds to the VGO. Sequential extraction of the heavier CFP layer should further increase the aromatic content of the enhanced VGO phase. FIG. 13 illustrates oxygenate migration resulted from the mixing of VGO with CFP oils. For both feedstocks (pine-derived CFP oil and Miscanthus-derived CFP oil) furans migrated to the resultant enhanced VGO layer, while phenolics remained in the heavier CFP residual layer. This separation may be useful for preparing biogenic phenol feedstocks.

Figure 16A:
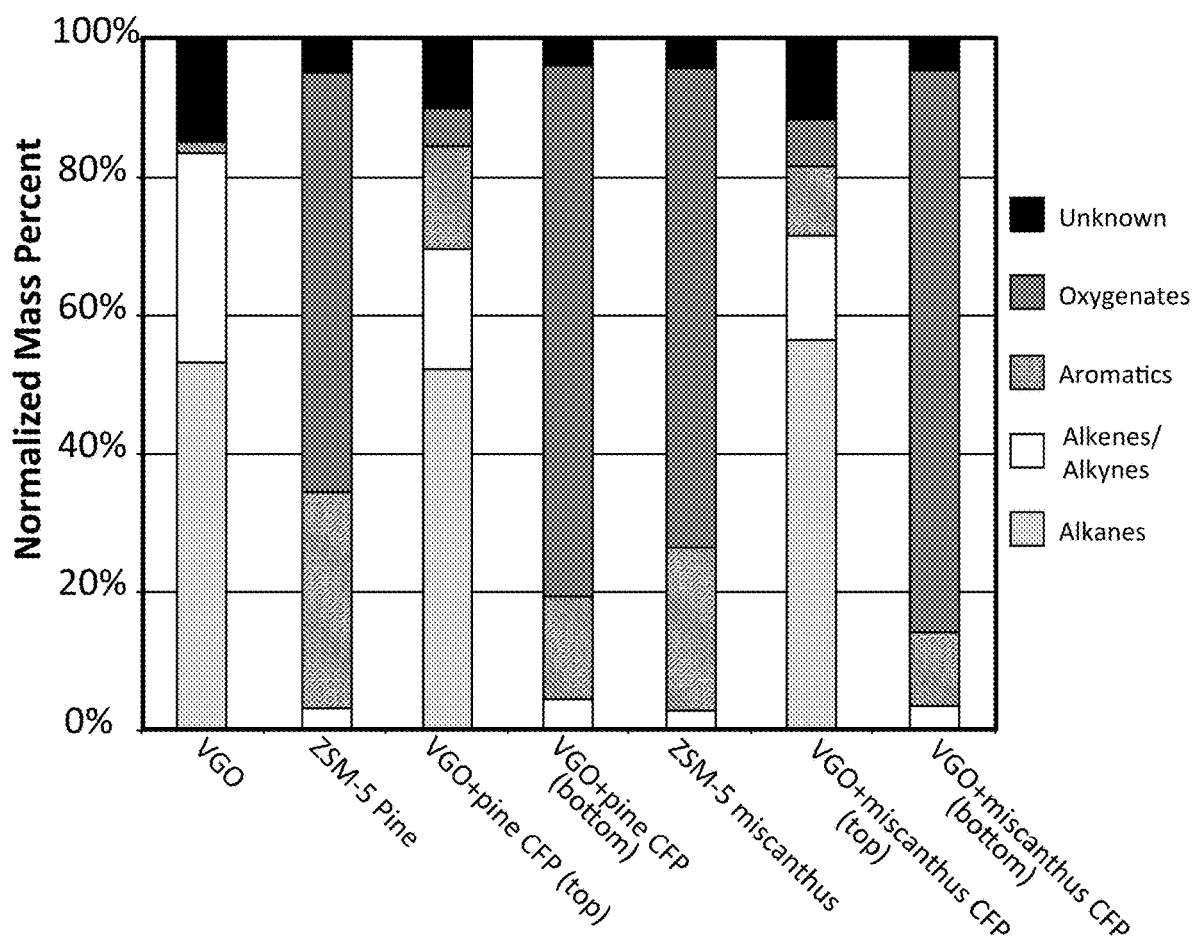
FIGS. 16A-16F illustrate the various compound distributions, as normalized mass percentages, as determined from GCxGC-TOFMS data of the top layer (i.e. enhanced VGO) and bottom layer resulting after mixing and phase separating various CFP oils (pine and miscanthus) with pure VGO, according to some embodiments of the present disclosure; general compounds (FIG. 16A); aromatics (FIG. 16B); 1-ring aromatics (FIG. 16C); phenols (FIG. 16D); carbonyls (FIG. 16E); and alkenes (FIG. 16F).
Figure 16B:
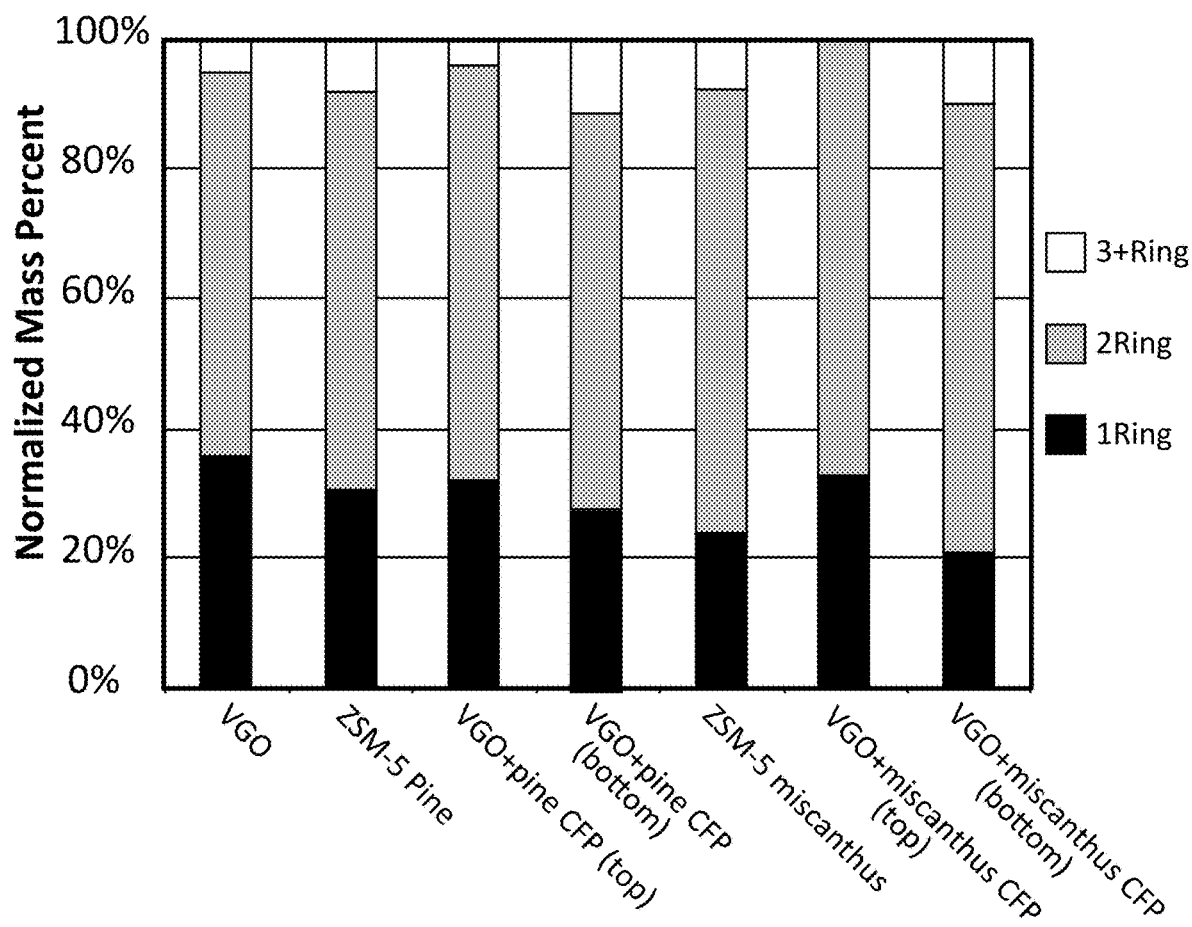
Figure 16C:
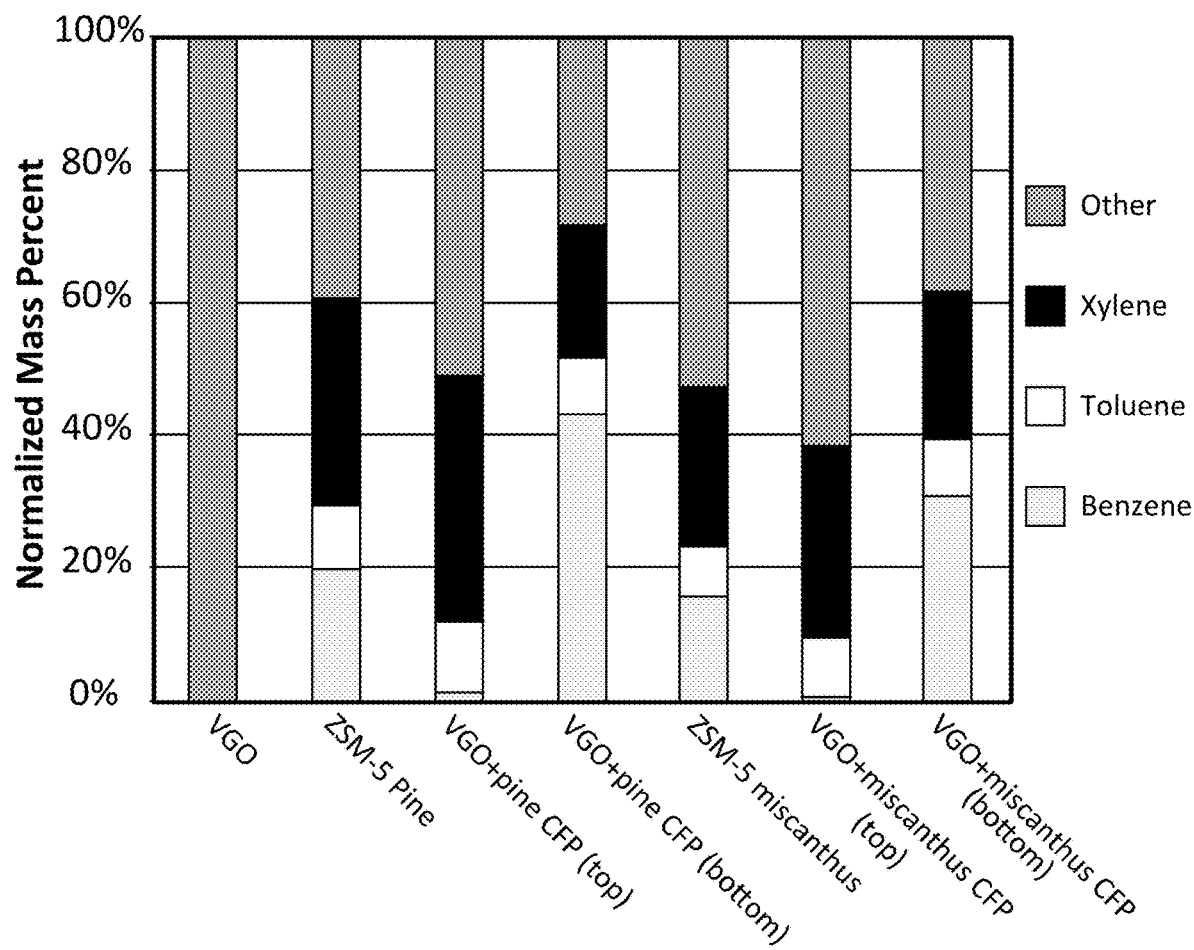
Figure 16D:
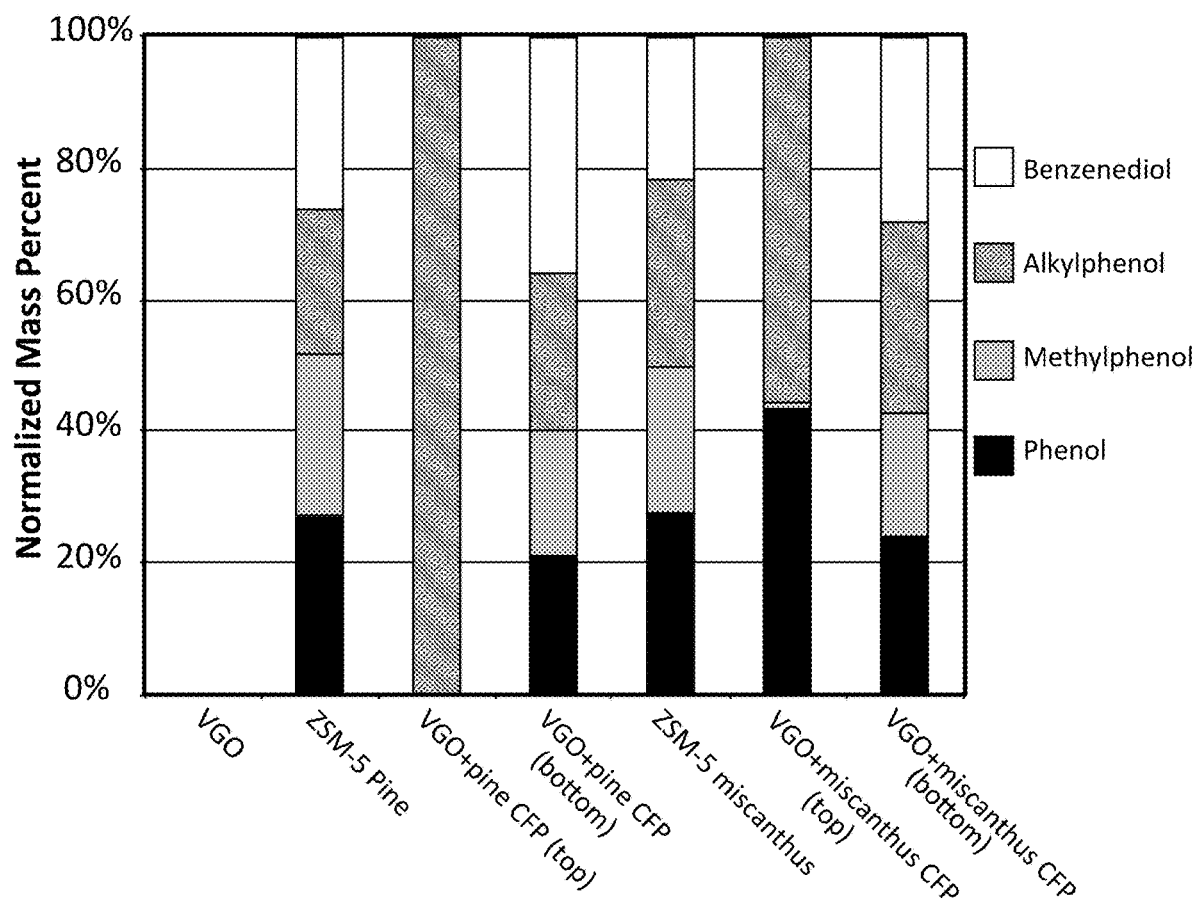
Figure 16E:
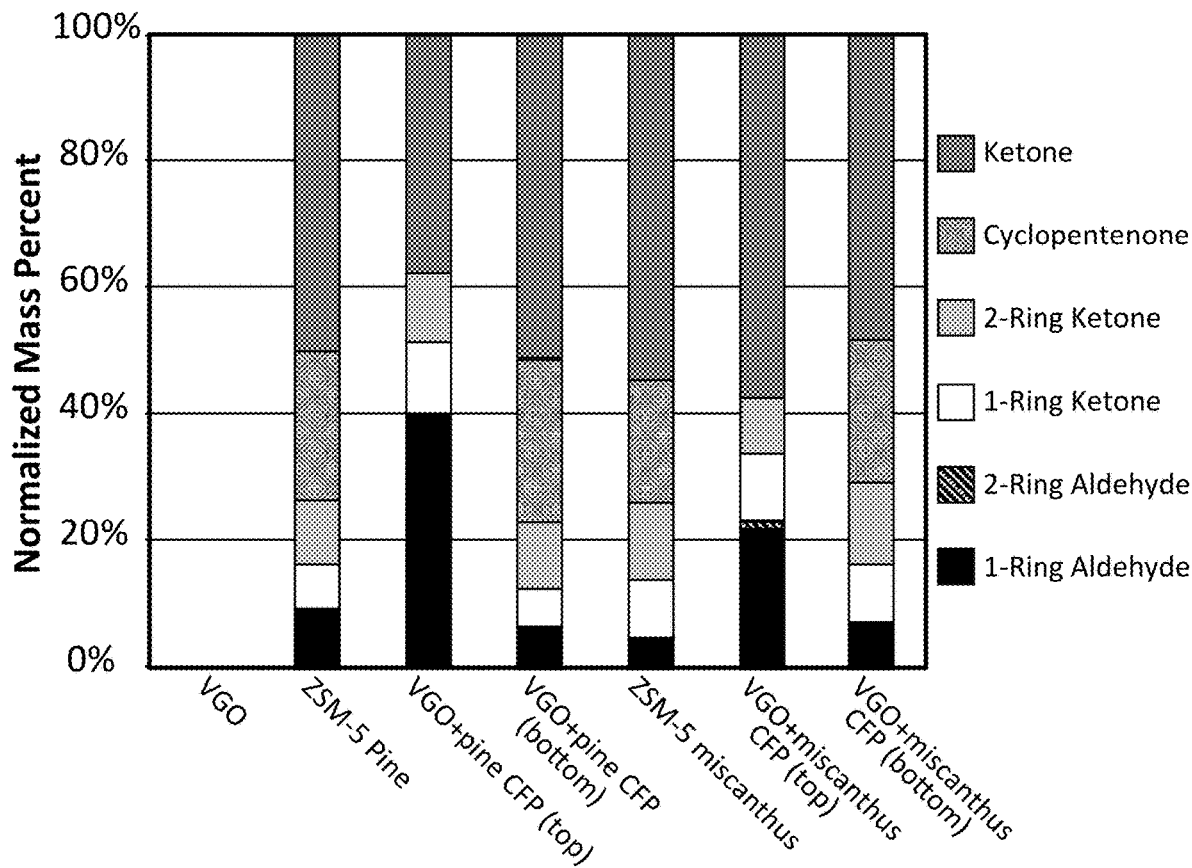
Figure 16F:
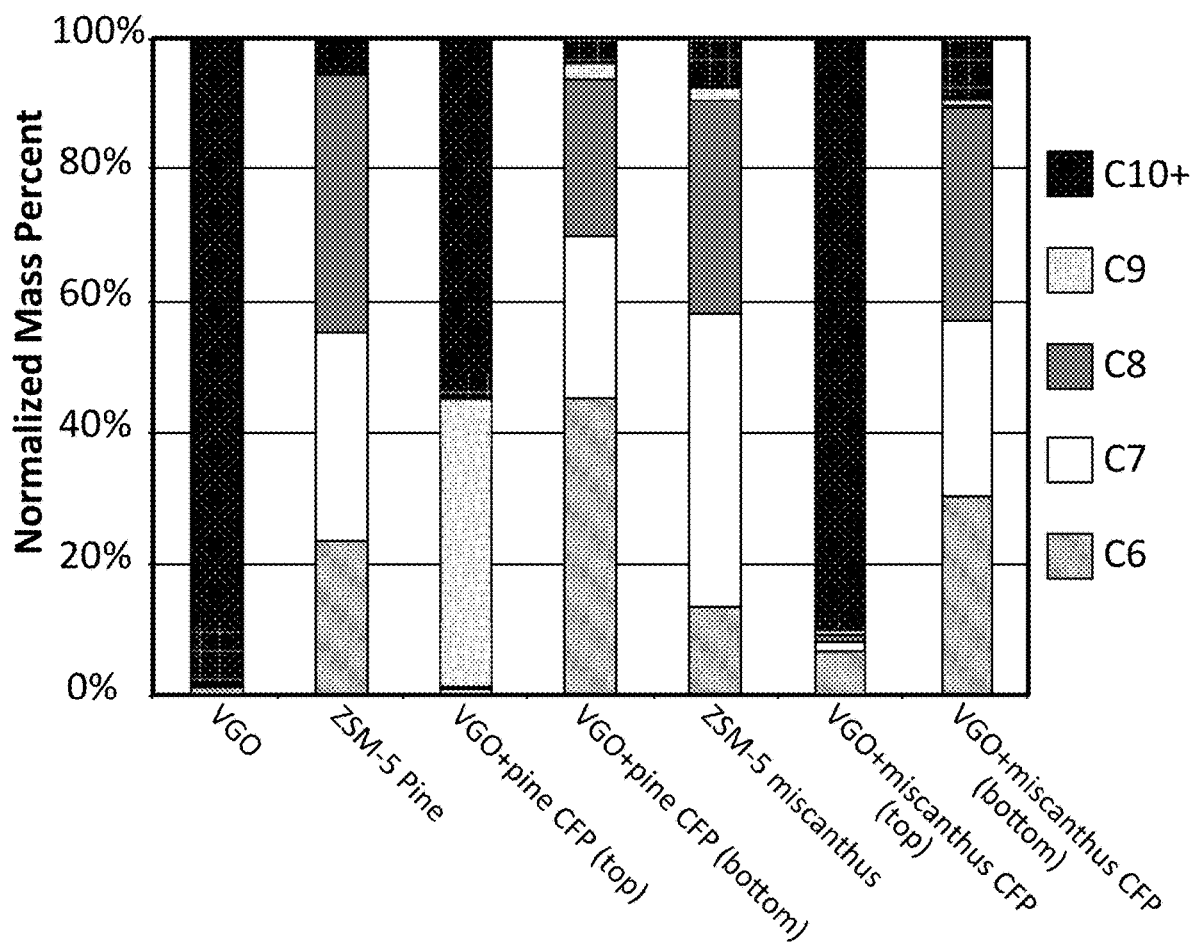

This analysis of VGO, pyrolysis oil, and enhanced VGO by extraction, continues in FIGS. 16A-16F, which illustrate the various compound distributions as determined from GCxGC-TOFMS data of the top and bottom layers resulting after mixing and phase separating various CFP oils (pine and miscanthus) with pure VGO, according to some embodiments of the present disclosure; bulk compound classes (see FIG. 16A); aromatics (see FIG. 16B); 1-ring aromatics (see FIG. 16C); phenols (see FIG. 16D); carbonyls (see FIG. 16E); and alkenes see (FIG. 16F). FIGS. 16A-F show the compositions of pure VGO and CFP feedstocks and the upper and lower layers of 50/50 mixtures of VGO and CFP oils after mechanical mixing and settling. Notably the top layer of settled mixtures was enhanced by 25 vol %. Pure feedstocks and the mixtures were analyzed by GCMS for compositional analyses. Comparing compound classes (see FIG. 16A) in VGO feedstock with pure CFP oils shows that pine and miscanthus contain aromatics and oxygenates with small amounts of alkenes/alkynes, while pure VGO contains alkanes, alkenes/alkynes and aromatics with no oxygenates. The volume enhanced top layers (i.e. enhanced VGO) contained increased amounts of alkanes, alkenes/alkynes and aromatics with very little oxygenates, which is a significant separation of oxygenates from the original CFP oil/VGO mixture. The volume reduced bottom layers contained reduced aromatics and most of the original oxygenates. Thus, this simple separation produces a biogenic carbon enhanced VGO/CFP feedstock that may be fed as a single liquid to refinery operations to produce biogenic carbon containing fuels and chemicals. This single liquid also reduces the complexity of feeding both VGO and CFP liquids separately to refinery upgrading processes. The oxygenate enriched bottom layers can be used to produce chemicals or marine bunker fuel via light upgrading. FIG. 16B shows that the bottom layers comprise heavier 3-ring aromatics compared with the top, enhanced VGO layers that contained the lighter 1- and 2-ring species. FIG. 16C shows that of the 1-ring aromatics, the top layers contained enhanced xylene and other ring species with no phenol, while the bottom layers contained primarily phenol. This result is another separation of potential chemicals from these mixtures. FIG. 16D shows the breakdown of phenol content with the top layers containing 100 vol % alkylphenol in the pine mixture (a significant result) and a 45/55 mixture of phenol and alkyl phenol in the miscanthus mixture. The bottom layers comprise increased benzenediol in both oil mixtures. FIG. 16E details carbonyl content with the top layer of both oils enhanced in 1-ring aldehydes and ketone with no cyclopentenone. The bottom layers contained cyclopentenone and this is a significant separation/concentration of this biogenic chemical. FIG. 16F shows alkene content with the top, VGO enhanced layer of the pine mixture enhanced in C9 alkenes while the top layer of the miscanthus mixture contained C6 alkenes. The bottom layer of both mixtures was enriched in C6 alkanes.

VGO/CFP oil upgrading: Based on the miscibility results described above, variations of VGO, CFP/VGO mixtures and catalysts were used as feedstocks for the DCR upgrading reactor to produce biogenic hydrocarbon fuels at a process relevant scale. Table 9 below lists these experiments; Run #s utilized in FIGS. 14A-C and 15.

TABLE 9

Pure VGO versus Mixed-Feed Upgrading Experiments, and Enhanced VGO

| Run # | Feedstock | Catalyst |
|---|---|---|
| 1 | VGO (Product C*) | E-Cat |
| 2 | VGO (Product C*) | E-Cat/10 wt % CP758 zeolite |
| 3A | 90 wt % VGO/10 wt % CFP (Product E*) | E-Cat |
| 3B | 90 wt % VGO/10 wt % CFP (Product E*) | E-Cat |
| 4 | 90 wt % enhanced VGO/10 wt % CFP (Product F*) | E-Cat/10 wt % CP758 zeolite |

*Refers to products listed in Table 1.

Upgrading reactions were completed using either pure E-Cat or a combination of 10 wt % CP758 zeolite with the remainder (90 wt %) E-Cat. These catalyst choices were used to upgrade a 10 wt % CFP-90 wt % VGO feed. VGO upgraded with E-Cat was performed as a control experiment. VGO upgraded with the catalyst mixture of zeolite/E-Cat assessed the impact of the additional catalyst on VGO product. The mixed feed was upgraded with either E-Cat as a baseline experiment or the mixed catalyst to assess impact on product composition. CFP oils from pine were produced and mixed with VGO to produce a single liquid feedstock for upgrading.

Figure 14A:
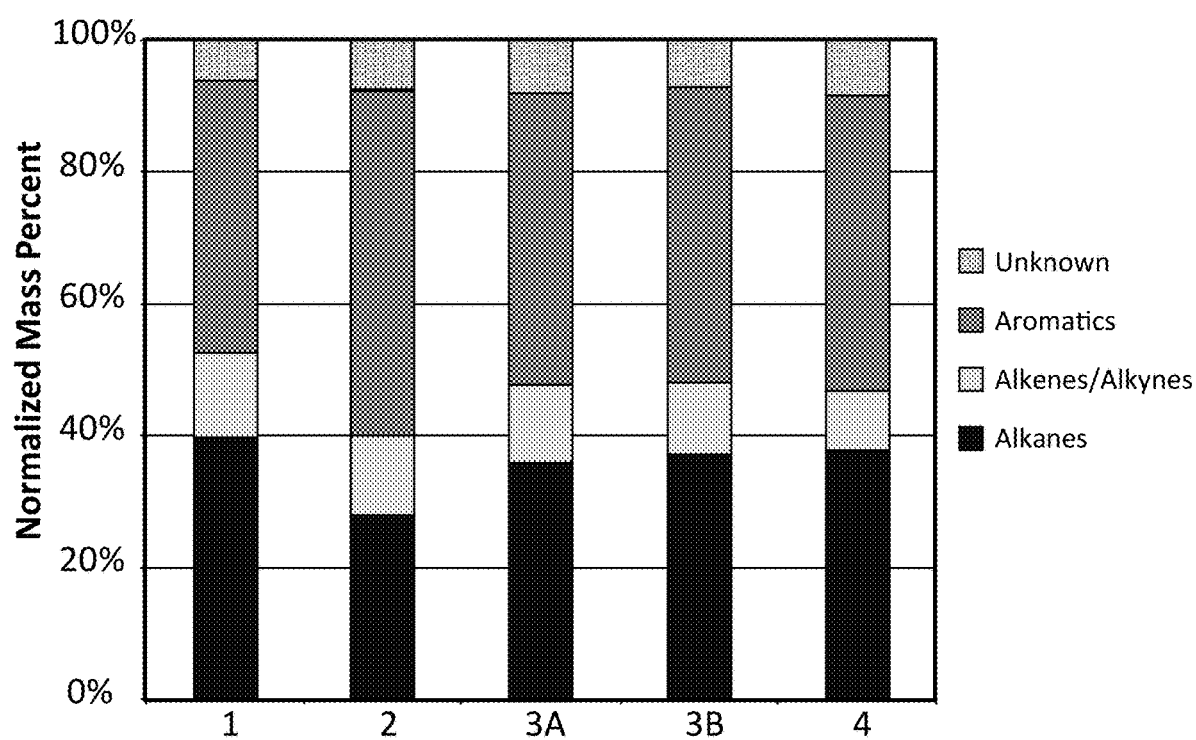
FIGS. 14A, 14B, and 14C illustrate the GCxGC-TOFMS data, as normalized mass percentages, classified into compound classes (FIG. 14A), aromatics (FIG. 14B), and alkanes (FIG. 14C) resulting from product upgrading according to the experiments summarized in Table 9, according to some embodiments of the present disclosure.
Figure 14B:
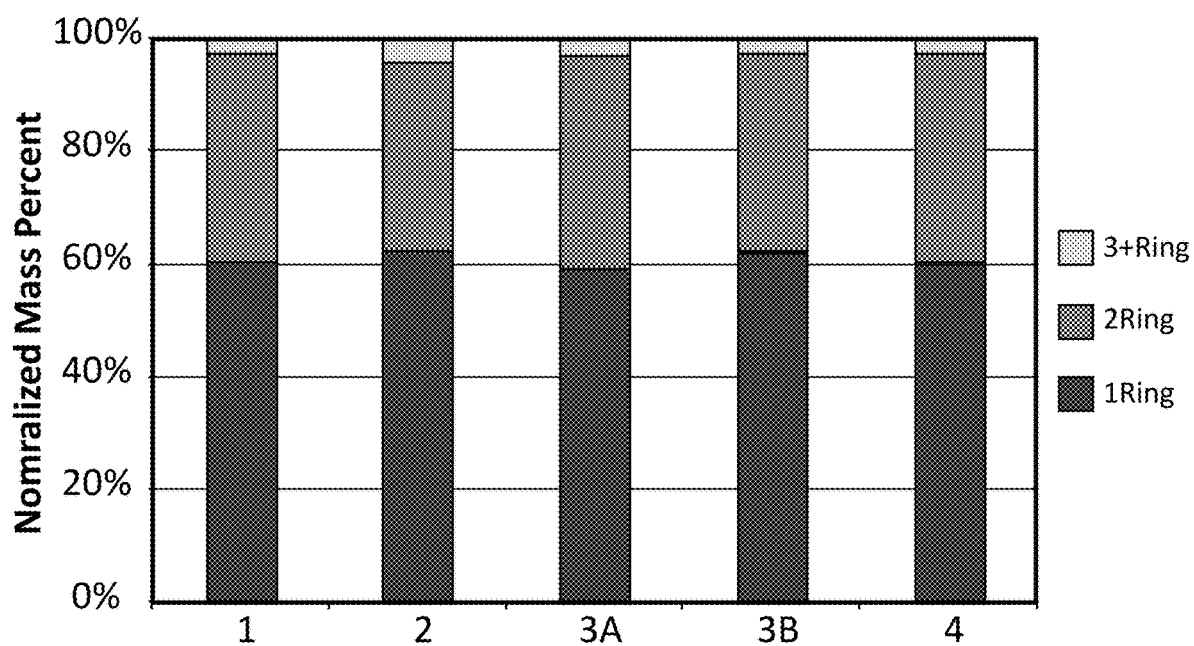
Figure 14C:
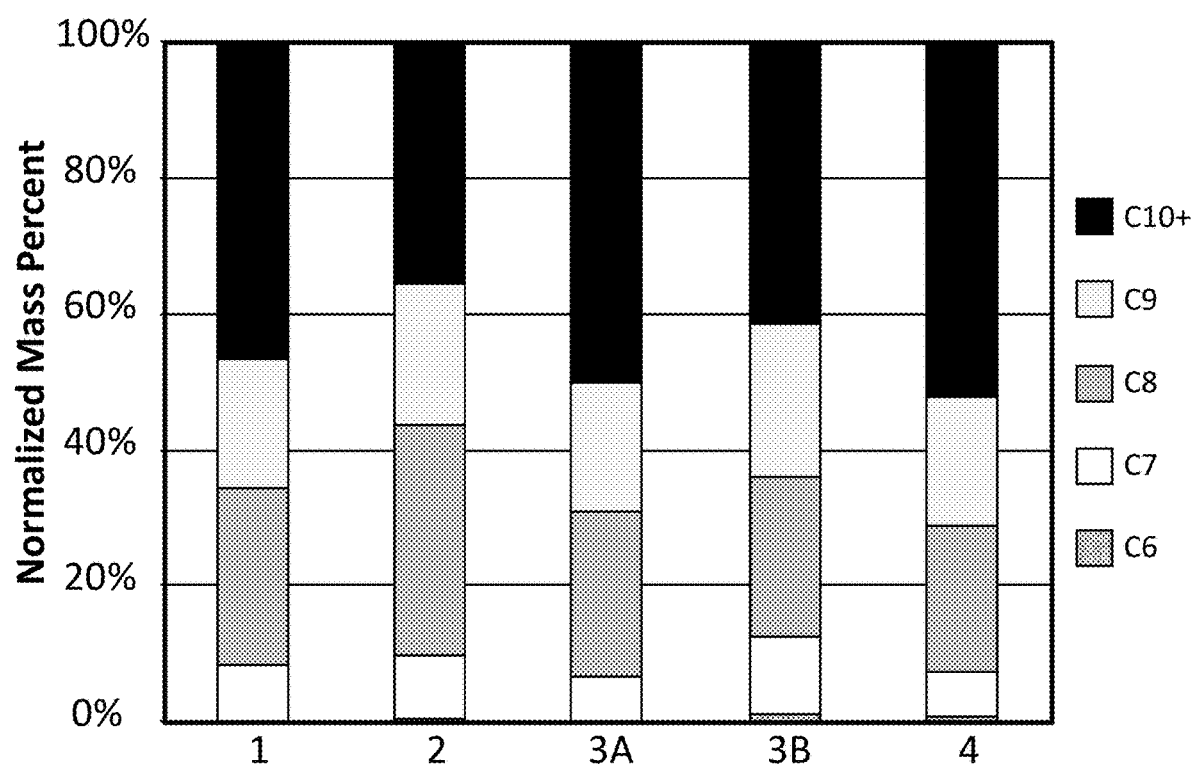

FIGS. 14A, 14B, and 14C illustrate the GCxGC-TOFMS data classified into compound classes (see FIG. 14A), aromatics (see FIG. 14B), and alkalies (see FIG. 14C) resulting from product upgrading according to the experiments summarized in Table 9, according to some embodiments of the present disclosure. Comparing the VGO/E-Cat product with the VGO-CFP/E-Cat/zeolite product clearly shows increased aromatics and at the cost of a reduction in alkanes in the mixed feed mixed catalyst experiment with slightly enhanced 1- and 2-ring aromatics and $C_{10+}$ alkanes. This result is also observed in the VGO-CFP experiment conducted with E-Cat even though E-Cat was less active for converting CFP feeds. Of particular significance, these experiments show that 10 wt % CFP oil mixed with VGO produced hydrocarbon fuels that are enriched in biogenic carbon containing alkanes and aromatics. Differences in product distribution are slight among the mixtures of E-Cat and 10 wt % CP758 with mixtures of VGO and 10 wt % pine CFP oil though C10+ and C8 alkanes are enhanced in the co-feed/co-catalyst product. Larger amounts of CFP oil in the co-feed should enhance product slates proportionally. This result has positive process impact implication for refineries who want biogenic carbon in co-processed product that is very similar to product from VGO only. Catalyst modifications (higher HZSM-5 content) that "tune" conversion to product slates amenable for refinery insertion (increased olefins) are possible, as is using catalysts (e.g. Pt/TiO₂) that enhance phenolics in the CFP oil for biogenic chemicals production and enhancing aromatics (e.g. toluene, xylene) for producing biogenic PET (polyethylene terephthalate) plastics for containers.

Figure 15:
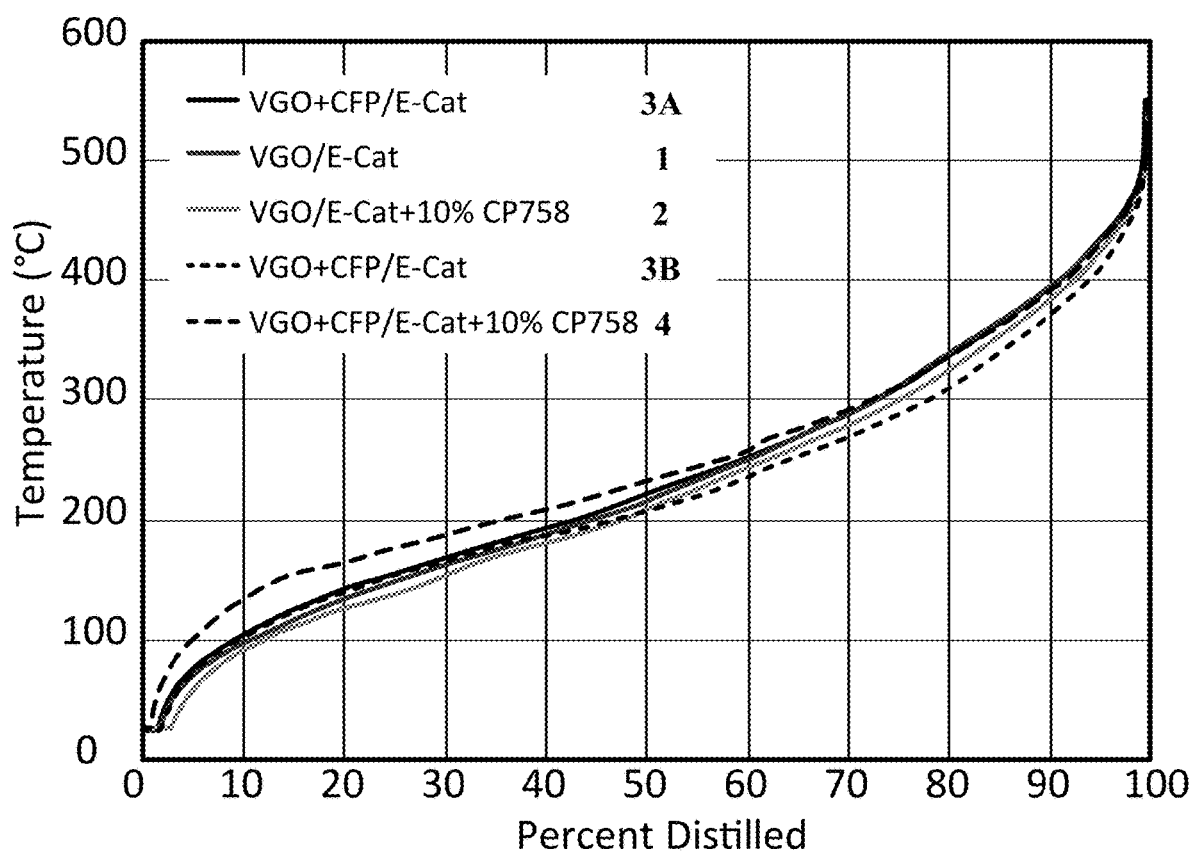
FIG. 15 illustrates a thermogravimetric analysis (TGA) based simulated distillation plot (SIM DIST) obtained for the various mixed-feed upgrading experiments summarized in Table 9, according to some embodiments of the present disclosure.

FIG. 15 a thermogravimetric analysis (TGA) based simulated distillation plot (SIM DIST) obtained for the various mixed-feed upgrading experiments summarized in Table 9, according to some embodiments of the present disclosure. The mixed feed/mixed catalyst product clearly contained increased lower molecular weight species up to 60 wt % mass loss than the control product from VGO and E-Cat. This supports the data shown in FIGS. 11A-11C and 12 that demonstrated increased aromatics and alkanes.

In some embodiments of the present disclosure, other feedstock combinations than VGO and CFP oils may be used. Other petroleum feedstocks that may be co-processed via the upgrading reactions described herein with fast pyrolysis (FP) and CFP liquids include light cycle oil (LC) and hydrocracked naphthenics. Additionally, hydrotreated FP and CFP liquids may be co-processed with these petroleum feeds. Compositionally, the most abundant constituent in LCO is aromatic compounds, especially the multi-ring aromatics. Selective hydrogenation and subsequent catalytic cracking of light cycle oil (LCO) from a fluid catalytic cracking unit is expected to produce more high-octane-number gasoline. In this process, the multi-ring aromatics are selectively hydrogenated and transformed to naphthenic aromatics, which are further converted into the gasoline fraction through cracking reaction. Naphthenic acids (NAs) are a mixture of several cyclopentyl and cyclohexyl carboxylic acids with molecular weight of 120 to well over 700 atomic mass units. The main fraction are carboxylic acids with a carbon backbone of 9 to 20 carbons. Naphthenic acids are represented by a general formula $C_nH_{2n-z}O_2$, where n indicates the carbon number and z specifies a homologous series. The z is equal to 0 for saturated, acyclic acids and increases to 2 in monocyclic naphthenic acids, to 4 in bicyclic naphthenic acids, to 6 in tricyclic acids, and to 8 in tetracyclic acids.

In summary, regarding CFP Oil compositions (Products A (upgraded FP oil only—stream 154) and C (upgraded VGO only—stream 115) in Table 1):
1) Liquid CFP oils were made via biomass (pine, hardwood) fast pyrolysis vapor upgrading using an FCC riser system (upgrading reactor) with two zeolite type catalysts containing mix of Y zeolite and HZSM-5 (both proprietary Johnson Matthey catalysts);
2) VGO was upgraded with industrially supplied E-Cat in the same system to produce baseline fuel liquid gasoline for comparison with the CFP liquids;
3) GCxGC-TOFMS shows the CFP aromatics contain up to 2x more 2-ring aromatics compared with VGO product and up to 20% more benzene and ~2x more xylene than the VGO product;

4) CP758 increased xylene and decreased alkyl phenol production with pine while reducing alcohol and ester formation;
5) CP758 with both feedstocks produced up to 80% (of total carbonyls) buta/enone—this is high selectivity to a single oxygenate, a green feedstock for varied chemicals production;
6) Pine with CP783 selectively produced up to 30% pentenone (of total carbonyls)—feedstock for natural products;
7) CFP oils have reduced oxygen content (20%) compared with analogous FP oils (50%); CFP oxygenates primarily comprise carbonyls, phenols, furans, and alcohols;
8) Phenol composition is influenced by catalyst choice: CP783 produced>40% alkylphenols (of total phenols) compared with CFP oils from CP758, which formed ~40% methyl phenols (cresols) with both feeds—providing a source of biogenic phenols for polymer production;
9) Catalyst choice (HZSM-5 content, binder, SAR, acid site strength and content) impacts CFP oil compositions: CP758 produced more xylene green—feedstock for PET production;
10) Results suggest range of zeolites to be evaluated should include >50 wt % HZSM-5.

In summary, regarding CFP/VGO miscibility:
1) CFP oil reduced oxygenate content suggests evaluating CFP/VGO mixtures for miscibility to generate a single liquid for DCR/FCC upgrading—to address/reduce complexity of co-feeding;
2) A 50/50 wt % mixture of VGO (less dense) and CFP oil (from pine and Miscanthus) (more dense) was miscible with simple mechanical stirring;
3) Removing stirring and letting the mixture settle produced a 25% volume enhancement in the lighter VGO layer (stable with time);
4) GCxGC-TOFMS analysis of the layers showed that biogenic CFP compounds (aromatics) from both feedstocks migrated to the VGO layer with up to 20% more 2-ring aromatics than VGO;
5) Biogenic toluene and xylene migrated to the enhanced layer for both feedstocks, benzene remained in the residual CFP layer—this has separations applications;
6) Sequential extractions with VGO may increase CFP compound incorporation as some transferrable aromatics remain in the CFP layer;
7) The enhanced VGO layer for both feedstocks contained increased alcohols and furans; phenols remained in the residual CFP layer—this has separations applications;
8) Cyclopentenone remains in the residual CFP layer for both feedstocks—this is a separations application;
9) Simple mechanical stirring of 50/50 VGO CFP mixtures produces a single feedstock for FCC upgrading—extend composition range to 10-90 wt % each component;
10) Simple settling of the 50/50 VGO CFP (from Miscanthus and pine) mixture produces a stable 25% volume enhancement of the VGO layer;
11) Enhanced VGO compositions comprise:
    a. Up to 20% more aromatics (1- and 2-ring compounds) compared to the starting VGO material;
    b. Up to 20% more toluene and 40% more xylene; benzene remains in the residual CFP layer (separations application for recovering xylene for green PET);
    c. Up to 10% more alcohols and 40% more furans—with pine;
    d. 0% phenols; and
    e. Up to 25% 1-ring aldehydes both feedstocks.
12) Residual CFP compositions comprise (after extraction step with the starting VGO):
    a. The majority of the carbonyls and phenols remain in the residual CFP—(small amounts may migrate to the enhanced VGO, layer but 90%+ remains in residual CFP, separations applications for chemical feedstocks i.e. phenol polymers and natural products).
    b. The residual layer additionally could serve as marine fuel (bunker fuel) with refinery treatment Regarding co-feeding CFP oils with VGO as a mixture to an upgrading reactor (Products E and F in Table 1 for starting VGO and enhanced VGO respectively):
1) CFP oils described above have 20 wt % or less oxygen compared with fast pyrolysis oils (50 wt %);
2) 10 wt % FP oils have been co-ted (separately) to an FCC unit before process issues begin (plugging), impact on gasoline composition per Petrobras work;
3) Straight line correlation of inverse relation between oxygenate content and weight % co-feed yields an upper limit of 40 wt % CFP oil co-feed with VGO;
4) The NREL produced pine-CFP/VGO mixtures were fed to an FCC unit as a single liquid feedstock (the feed mix was stirred in the feed tank)—this is process intensification with potential reduction of process cost;
5) Baselining experiments were VGO/E-Cat for gasoline production and VGO/10 wt % CP758 zeolite and 90 wt % E-Cat to assess impact of mixed catalyst on gasoline range hydrocarbon composition;
6) Co-fed experiments were two replicates of VGO-CFP upgraded with E-Cat only to assess mixed feed impact on gasoline product;
7) Mixed feed/mixed catalyst (10 wt % CFP+90 wt % VGO/10 wt % CP758+90 wt % E-Cat) assessed impact of mixed feedstock with optimized catalyst mixture on liquid fuel composition;
8) Upgraded fuel compositions showed that:
    a. CP758 zeolite addition to E-Cat upgraded pure VGO to contain more aromatics—this is consistent with zeolite addition to E-Cat;
    b. Adding CFP to VGO and upgrading with E-Cat only produced more aromatics and less alkanes—fuels from replicate experiments were identical; and
    c. The mixed feed/mixed catalyst (10 wt % CFP+90 wt % VGO/10 wt % CP758+90 wt % E-Cat) produced more aromatics (enhanced 2-ring species) and less alkenes/alkynes; >10% C10+ alkanes and C10+ alkenes, oxygenates in product liquids were at detection limits of the GCxGC-TOFMS.
9) Liter amounts of pine CFP oils of 20 wt % or less oxygenates were produced by catalytic upgrading with zeolites via FCC using a coupled pyrolyzer/DCR system;
10) A mechanically stirred mixture of 10 wt % pine-CFP+90 wt % VGO was successfully fed as a single liquid to a DCR system for FCC upgrading with variations of E-Cat and HZSM-5 mixtures to biogenic carbon containing hydrocarbon fuels;
11) Up to 40 wt % CFP liquid (20 wt % oxygenate) may be co-fed with VGO based on extrapolating the Petrobras mixtures (50 wt % oxygenate at 10 wt % mixture with VGO);
12) Biogenic carbon containing hydrocarbon liquids were produced from single feed upgrading experiments comprising variations of catalyst (E-Cat and HZSM-5 zeolite) and feedstock (pine-CFP oil and VGO); and
13) Other catalyst (metallized zeolites with M=Ga, Pt, Ru, Ag etc.), CFP (varied biomass feedstock i.e. grasses, woods, forest residues, wood wastes) VGO combinations should provide ability to tune fuel composition properties for specific refinery needs (enhanced olefins, diesel species).

Thus, for the first time, biomass derived fast pyrolysis vapors were catalytically upgraded to greater than liter quantities of liquid hydrocarbon fuels, termed catalytic fast pyrolysis oils (CFP), using varied industrial zeolite catalysts (E-Cat and HZSM-5 variants), biomass feedstocks (pine and Miscanthus), and pilot scale FCC processing.

Produced CFP liquids contain significantly less oxygen content (20%) compared with analogous fast pyrolysis liquids (50%) with oxygenates of interest (percent of carbonyls) comprising >70% buta/enone (butanone and/or butenone) in pine CFP oils and 20% cyclopentenone in Miscanthus CFP oil. Other compositional differences are due to zeolite catalyst composition (varied HZSM-5 content). These compounds may be useful as feedstocks for biogenic chemicals production. CFP oils additionally contained 1-ring aromatics (benzene, toluene, xylene), which are not in FCC petroleum vacuum gas oil (VGO). Enhanced biogenic xylene is a significant feedstock for "green" PET polymer production.

The CFP oil composition (reduced oxygenates, enhanced aromatics) was shown to be miscible with VGO with simple mechanical mixing. Settling of the 50/50 vol % mixture formed a 25% volume enhanced light VGO layer and an analogous reduced volume CFP layer. Settled layer compositions were strikingly different with oxygenates remaining in the residual CFP layer. Additionally, no benzene remained in the residual Miscanthus CFP layer. Some toluene and xylene remain in this layer suggesting that sequential extraction with VGO would further increase their concentration in the enhanced VGO layer.

Co-processing single feed mixtures of 90 vol % 10 vol % VGO with the CFP oils and enhanced VGO layers produced gasoline with slightly higher light aromatics content. This result is significant because current state of the art uses two independent nozzles for co-feeding VGO with FP liquids to produce biogenic carbon containing fuels. Single liquid feeding is significant process intensification that likely will result in both capital and operating costs in a refinery setting. Demonstrating that CFP oil can be processed with VGO using refinery upgrading is significant in that the gasoline composition did not contain oxygenates and only slight enhancement of aromatics and alkanes. Further work with catalyst compositions and biomass feedstocks should provide "tunable i.e. enhanced olefins per refinery request" CFP feedstocks for petroleum co-processing. Further work with the residual CFP layers may result in economical separations to produce green feedstocks for chemicals production (PET from xylene, phenolic resins from phenols, natural products from furans and cyclopentenones).

Some of the observations/characteristics/properties listed above and/or described herein are summarized in Table 10 below:

TABLE 10

Experimental Summary
(All percentages as wt %, unless noted otherwise)

| CFP Liquid | Co-Feed CFP Liquid with VGO | Product Property #1 | Product Property #2 | Product Property #3 |
|---|---|---|---|---|
| Pure CFP Oils using Biomass Fast Pyrolysis Vapors using Zeolites and DCR system (composition ranges listed for pine CFP - Mis. CFP oil or ≤ when ranges are close) (Product A in Table 1) | | | | |
| Pine-CFP oil Mis.-CFP oil | | 48-57% total aromatics of which: 27-31% 1-ring aromatics of which: 7-14% benzene 6-9% toluene 19-35% xylene 61-65% 2-ring aromatics | 38-48% oxygenates of which: 26-31% are phenolics of which: 41-44% phenol 17-40% methylphenols (cresols) 16-41% other alkyl phenols | 27-37% of total oxygenates as carbonyls of which: 29-82%-buta/enone 10-28% pentenone 2-32% -1-ring ketones |
| CFP/VGO Miscibility - Enhanced VGO Layer (top) | | | | |
| 50 vol % Pine CFP oil 50 vol % Miscanthus CFP oil | 50 vol % VGO | 52-57% alkanes 15-18% alkenes 10-15% aromatics of which: 32-33% 1-ring of which: 9-11% toluene 29-37% xylene 64-67% 2-ring | 5-7% oxygenates of which: 38-57% linear ketones 22-40% 1-ring aldehydes 10-12% 1-ring ketone | Other oxy genates comprising phenols of which: 55-100% alkyl phenol 0-43% phenol |
| CFP/VGO Miscibility -Residual CFP Layer (bottom) | | | | |
| 50 vol % Pine CFP oil 50 vol % Miscanthus CFP oil | 50 vol % VGO | 10-15% aromatics of which: 21-27% 1-ring of which: 30-44% benzene 8-9% toluene 20-22% xylene 61-70% 2-ring | 3-4% Alkenes of which: 30-45% C6s 25-28% C7s 24-33% C8s | 77-82% oxygenates of which: 28-29% carbonyls of which: 22-26% cyclopentenone 6-9% 1-ring ketones 10-13% 2-ring ketones 48-51% linear ketones |
| Hydrocarbon Fuels from Co-Fed CFP/starting VGO (Product E in Table 1) | | | | |
| 10 wt % pine-CFP | 90 wt % VGO | 45-52% aromatics of which 60-63% 1-ring of which 0% benzene, 6-7% toluene, 17% xylene 34-37% 2-ring | 7-30% reduction alkenes and alkynes | |

Whether or not a reactant or product described herein is "bioderived" or "biomass derived" may be determined by analytical methods. Using radiocarbon and isotope ratio mass spectrometry analysis, the bio-based content of materials can be determined. ASTM International (formerly known as the American Society for Testing and Materials) has established a standard method for assessing the biobased content of carbon-containing materials. The ASTM method is designated ASTM D6866. The application of ASTM D6866 to derive a "biobased content" is built on the same concepts as radiocarbon dating, but without use of the age equations. The analysis is performed by deriving a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pNMC value obtained correlates directly to the amount of biomass material present in the sample. Thus, ASTM D6866 may be used to validate that the compositions described herein are and/or are not derived from renewable sources.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method comprising:
pyrolyzing a biomass in a pyrolysis reactor to produce a pyrolysis oil;
a first upgrading of the pyrolysis oil in a fluidized bed to yield a first upgraded pyrolysis oil;
recycling at least a portion of the first upgraded pyrolysis oil;
mixing the portion of the first upgraded pyrolysis oil with a petroleum-derived oil to form a mixture;
separating from the mixture a light phase from a heavy phase; and
a second upgrading of at least one of the light phase or the first upgraded pyrolysis oil in the fluidized bed reactor to form a second upgraded pyrolysis oil, wherein:
the light phase has a first composition comprising less than about 7 wt % oxygenates; and
the pyrolysis oil is in at least one of a liquid phase or a vapor phase.

2. The method of claim 1, wherein the first upgrading is performed at a first temperature between 450° C. and 600° C.

3. The method of claim 1, wherein the first upgrading is performed at a pressure between 1.0 atmosphere and 3.0 atmospheres.

4. The method of claim 1, wherein the first upgrading is performed using a zeolite that has an average bulk density between 0.80 g/cm3 and 1.00 g/cm3.

5. The method of claim 4, wherein the zeolite comprises at least 50 wt % HZSM-5.

6. The method of claim 4, wherein the zeolite has an average particle size between 60 μm to 100 μm.

7. The method of claim 1, wherein the biomass comprises at least one of an agricultural waste, a forest waste, or a municipal waste.

8. The method of claim 1, wherein the biomass comprises at least one of a hardwood, a softwood, or a grass.

9. The method of claim 1, wherein:
the first upgraded pyrolysis oil has a second composition comprising:
an aromatics concentration between about 45 wt % and about 57 wt %, wherein:
between about 27 wt % and about 31 wt % of the aromatics are 1-ring aromatics, and
between about 61 wt % and about 65 wt % of the aromatics are 2-ring aromatics.

10. The method of claim 9, wherein
the second composition further comprises
an oxygenates concentration between about 38 wt % and 48 wt %, wherein:
between about 26 wt % and about 31 wt % of the oxygenates are a phenolic, and
the phenolic comprises at least one of between about 41 wt % and about 44% phenol, or
between about 17 wt % and about 40 wt % methylphenol.

11. The method of claim 1, wherein the mixing is completed at a ratio of the portion of the first upgraded pyrolysis oil to the petroleum-derived oil between 0:1 and 1000:1.

12. The method of claim 1, wherein:
the second upgraded pyrolysis oil has a third composition comprising:
an aromatics concentration between about 45 wt % and about 52 wt %, wherein:
between about 60 wt % and about 63 wt % of the aromatics are 1-ring aromatics, and
between about 34 wt % and about 37 wt % of the aromatics are 2-ring aromatics.

13. The method of claim 12, wherein:
the 1-ring aromatics comprise:
about 0 wt % benzene;
between about 6 wt % and about 7 wt % toluene, and
about 17 wt % xylene.

14. The method of claim 1, wherein:
the light phase has a thirdfirst composition comprisingfurther comprises at least one of:
between about 52 wt % and about 57 wt % alkanes;
between about 15 wt % and about 18 wt % alkenes; or
between about 10 wt % and about 15 wt % aromatics.

15. The method of claim 14, wherein the oxygenates comprise at least one of
between about 38 wt % and about 57 wt % of the oxygenates are linear ketones, or
between about 22 wt % and about 40 wt % of the oxygenates arc 1 ring aldehydes.

16. The method of claim 1, wherein the pyrolyzing is performed in the pyrolysis reactor at a second temperature between 400° C. and 600° C.

17. The method of claim 16, wherein the biomass has a residence time of less than five seconds in the pyrolysis reactor.

\* \* \* \* \*